(12) United States Patent
Drechsler et al.

(10) Patent No.: US 11,668,726 B2
(45) Date of Patent: Jun. 6, 2023

(54) SYSTEMS AND METHODS FOR STAINING OF BIOLOGICAL SAMPLES

(71) Applicants: Ventana Medical Systems, Inc., Tucson, AZ (US); Roche Diagnostics Operations, Inc., Indianapolis, IN (US)

(72) Inventors: Andreas Drechsler, Baar (CH); Oliver Gutmann, Thalwil (CH); Melis Hazar, Tucson, AZ (US); Reto Huesser, Cham (CH); Raymond T. Kozikowski, III, Tucson, AZ (US); Daniel Mueller, Rotkreuz (CH); Chris Steinert, Lucerne (CH)

(73) Assignees: Ventana Medical Systems, Inc., Tucson, AZ (US); Roche Diagnostics Operations, Inc., Indianapolis, IN (US)

( * ) Notice: Subject to any disclaimer, the term of this patent is extended or adjusted under 35 U.S.C. 154(b) by 716 days.

(21) Appl. No.: 16/388,797

(22) Filed: Apr. 18, 2019

(65) Prior Publication Data
US 2019/0242921 A1    Aug. 8, 2019

Related U.S. Application Data

(63) Continuation of application No. PCT/EP2017/076558, filed on Oct. 18, 2017.

(60) Provisional application No. 62/410,317, filed on Oct. 19, 2016.

(51) Int. Cl.
*G01N 35/10*    (2006.01)
*G01N 1/31*    (2006.01)

(52) U.S. Cl.
CPC ......... *G01N 35/1016* (2013.01); *G01N 1/312* (2013.01); *G01N 35/1002* (2013.01); *G01N 35/1009* (2013.01); *G01N 35/1011* (2013.01); *G01N 2001/317* (2013.01); *G01N 2035/1041* (2013.01)

(58) Field of Classification Search
CPC ............ G01N 1/312; G01N 2001/317; G01N 2035/1041; G01N 35/1002; G01N 35/1009; G01N 35/1011; G01N 35/1016; B01L 2200/16; B01L 2300/1805; B01L 2300/1822; B01L 2400/0439; B01L 3/0268; B01L 3/5027; B01L 9/52
See application file for complete search history.

(56) References Cited

U.S. PATENT DOCUMENTS

| | | |
|---|---|---|
| 4,877,745 A | 10/1989 | Hayes et al. |
| 4,914,022 A | 4/1990 | Furmanski et al. |
| 5,658,802 A | 8/1997 | Hayes et al. |
| 6,664,044 B1 | 12/2003 | Sato |
| 6,716,629 B2 | 4/2004 | Hess |
| 9,725,613 B2 | 8/2017 | Lopez Garcia et al. |
| 2002/0176804 A1* | 11/2002 | Strand .................... G16H 10/65 422/400 |
| 2002/0180475 A1 | 12/2002 | Watanabe et al. |
| 2002/0192702 A1 | 12/2002 | Kononen et al. |
| 2003/0081209 A1 | 5/2003 | Takahashi et al. |
| 2003/0143756 A1 | 7/2003 | Fisher et al. |
| 2004/0136876 A1 | 7/2004 | Fouillet |
| 2006/0105453 A1 | 5/2006 | Brenan |
| 2008/0090267 A1 | 4/2008 | Komatsu et al. |
| 2008/0106577 A1 | 5/2008 | Hanaoka et al. |
| 2010/0128988 A1 | 5/2010 | Kincaid |
| 2010/0285573 A1 | 11/2010 | Leck |
| 2012/0122197 A1 | 5/2012 | Jospeh |
| 2012/0329143 A1 | 12/2012 | Yamazaki |
| 2013/0250090 A1 | 9/2013 | Morimoto |
| 2017/0292899 A1 | 10/2017 | Kasamatsu et al. |
| 2018/0052082 A1 | 2/2018 | Groll et al. |
| 2019/0242921 A1* | 8/2019 | Drechsler ................. B01L 9/52 |

FOREIGN PATENT DOCUMENTS

| | | |
|---|---|---|
| JP | 2002-267675 A | 9/2002 |
| JP | 2003004609 A | 1/2003 |
| JP | 2003130866 A | 5/2003 |
| JP | 2007-526479 A | 9/2007 |
| JP | 2008096245 A | 4/2008 |
| JP | 2008/164517 A | 7/2008 |
| JP | 2008185504 A | 8/2008 |
| JP | 2010521678 A | 6/2010 |
| JP | 2013-007688 A | 1/2013 |
| JP | 2015-004552 A | 1/2015 |
| JP | 2015-017258 A | 1/2015 |

(Continued)

OTHER PUBLICATIONS

International Search Report and Written Opinion dated Feb. 21, 2018 in corresponding PCT/EP2017/076558 filed Oct. 18, 2017, pp. 1-16.
Lovchik et al., Lab Chip, 2012, pp. 1040-1043.
Lovchik et al., Microfluidic Probe for Advanced Staining of Human Tissue Sections, 15th International Conference on Miniaturized Systems for Chemistry and Life Sciences, Oct. 2-6, 2011, pp. 368-370.
Pepper et al., Thermal Inkjet Printing for Precision Histological Staining, Journal of Histotechnology, 2011, pp. 123-131, vol. 24, No. 3.

(Continued)

*Primary Examiner* — Blaine Lankford
(74) *Attorney, Agent, or Firm* — Charney IP Law LLC; Thomas M. Finetti

(57) ABSTRACT

A system and method for treatment of biological samples is disclosed. In some embodiments, an automated biological sample staining system (100), comprising at least one microfluidic reagent applicator (118); at least one bulk fluid applicator (116); at least one fluid aspirator; at least one sample substrate holder; at least one relative motion system; and a control system (102) that is programmed to execute at least one staining protocol on a sample mounted on a substrate that is held in the at least one sample substrate holder.

35 Claims, 15 Drawing Sheets

(56) References Cited

FOREIGN PATENT DOCUMENTS

| | | | |
|---|---|---|---|
| JP | 2015-500983 A | 1/2015 |
| WO | 98/58240 A1 | 12/1998 |
| WO | 01/57254 A2 | 8/2001 |
| WO | 2001057254 A2 | 8/2001 |
| WO | 03/072258 A1 | 9/2003 |
| WO | 2004111610 A2 | 12/2004 |
| WO | 2005/084263 A2 | 9/2005 |
| WO | 2006046747 A1 | 5/2006 |
| WO | 2008/112993 A1 | 9/2008 |
| WO | 2008112993 A1 | 9/2008 |
| WO | 2011/087841 A1 | 7/2011 |
| WO | 2012/066827 A1 | 5/2012 |
| WO | 2013071357 A2 | 5/2013 |
| WO | 2014/030856 A1 | 2/2014 |
| WO | 2014188029 A1 | 11/2014 |
| WO | 2015/086534 A1 | 6/2015 |
| WO | 2016/047625 A1 | 3/2016 |
| WO | 2016/170008 A1 | 10/2016 |

OTHER PUBLICATIONS

International Preliminary Report on Patentability dated Nov. 2, 2017 in corresponding PCT/EP2016/058801 filed Apr. 20, 2016, 13 pages.
International Search Report and Written Opinion for PCT/EP2016/058801, dated Sep. 16, 2016.
Guo, M.T. et al., Droplet microfluidics for high-throughput biological assays, Lab on a Chip, (2012), pp. 2146-2155, vol. 12.
Puckett, C.A. et al., Fluorescein redirects a ruthenium-octaarginine conjugate to the nucleus, Journal of the American Chemical Society, (2009), pp. 8738-8739, vol. 131 Issue 25.
SIGMA, Biofiles_In Vitro, SIGMA, (2008), pp. 1-20, vol. 2.
Slidders, W., A stable iron-hematoxylin solution for staining the chromatin of cell nuclei, Journal of Microscopy, (1969), pp. 61-65, vol. 90, No. 1.
Zaugg et al., "Drop-on-Demand Printing of Protein Biochip Arrays," MRS Bulletin/Nov. 2003; www.mrs.org/publications/bulletin.
Mukai, et al., "Visualizing Protein Maps," Antigen Retrieval Immunohistochemistry Based Research and Diagnostics, ☐ Edited by Shan-Rong Shi and Clive R. Taylor Copyright © 2010 John Wiley & Sons, Inc.
Risio et al., "Piezoelectric Ink-Jet Printing of Horseradish Peroxidase: Effect of Ink Viscosity Modifiers on Activity," Macromol. Rapid Commun. 2007, 28, 1934-1940, 2007 WILEY-VCH Verlag GmbH & Co. KGaA, Weinheim; DOI: 10.1002/marc.200700226.
Lanini et al., "Dispensing an enzyme-conjugated solution into an ELISA plate by adapting ink-jet printers," J. Biochem. Biophys. Methods 70 (2008) 1180-1184.
Anonymous, Inkjet technology, Wikipedia, (2016), Retrieved from the Internet: URL:https://en.wikipedia.org/w/index.php?title=Inkjet_technology&oldid=718089954.
Anonymous, Paraffin wax, Wikipedia, (2016), Retrieved from the Internet: URL:https://en.wikipedia.org/w/index.php?title=Paraffin_wax&direction=prev&oldid=744993819.
Polysciences, Inc., Technical Data Sheet 192, Gill's Hematoxylin—Specific for Staining Nuclei, 2015, https://www.polysciences.com/media/pdf/technical-data-sheets/TDS-20192.pdf, pp. 1-2.
Shi, Shan-Rong et al., Antigen Retrieval Immunohistochemistry Based Research and Diagnostics, Visualizing Protein Maps in Tissue, (2010), pp. 369-389, Chapter 21, John Wiley & Sons, Inc.

* cited by examiner

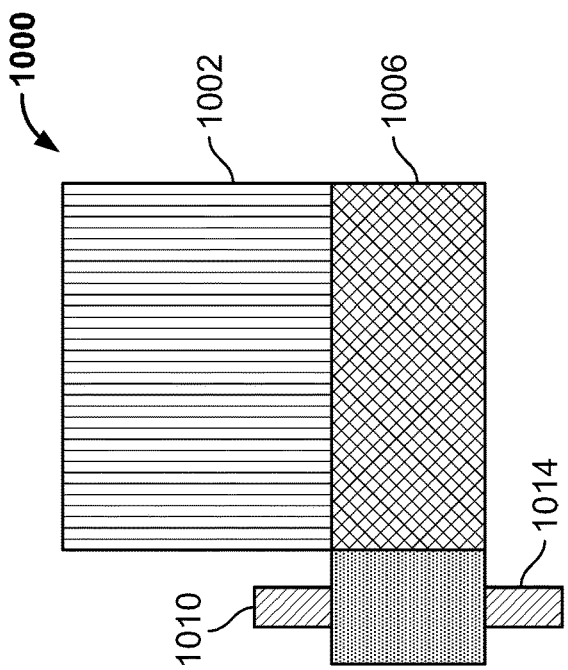
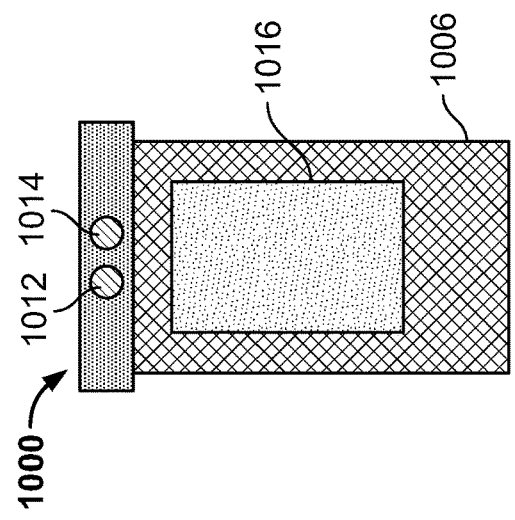
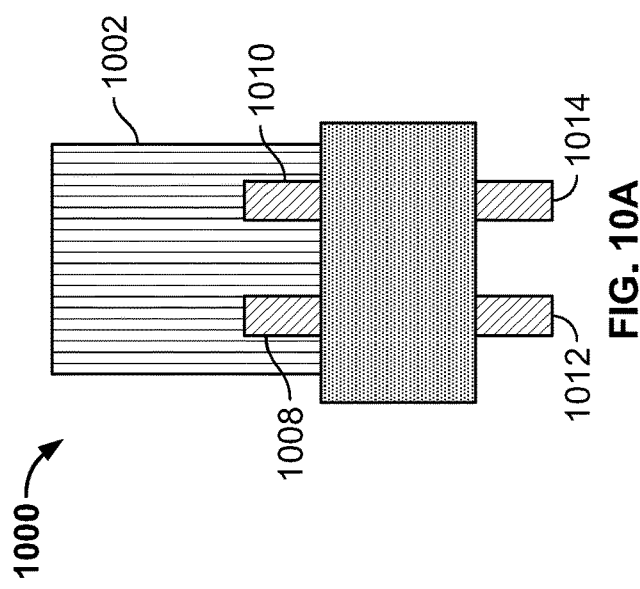
FIG. 10A
FIG. 10B
FIG. 10C

Microfluidic Deparaffinization

Printed Deparaffinization

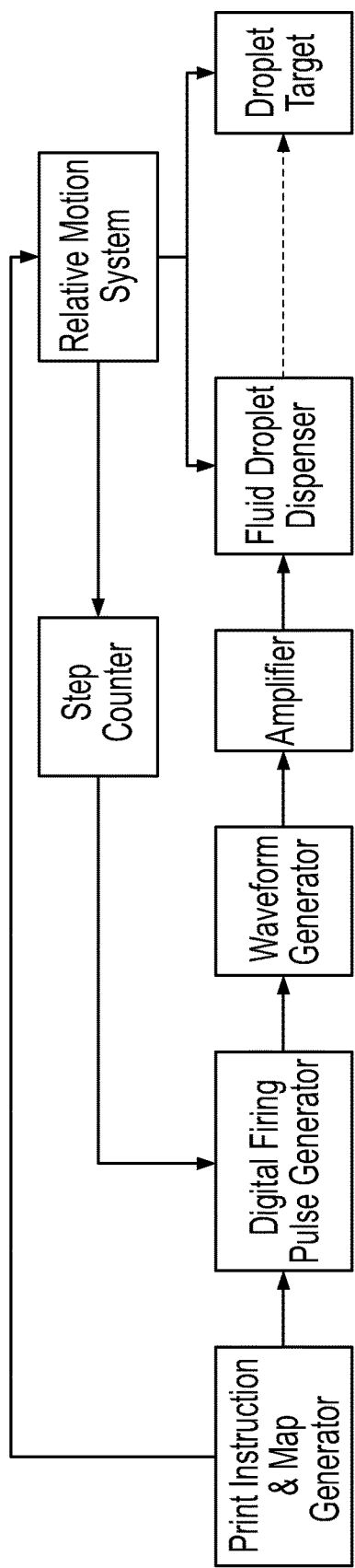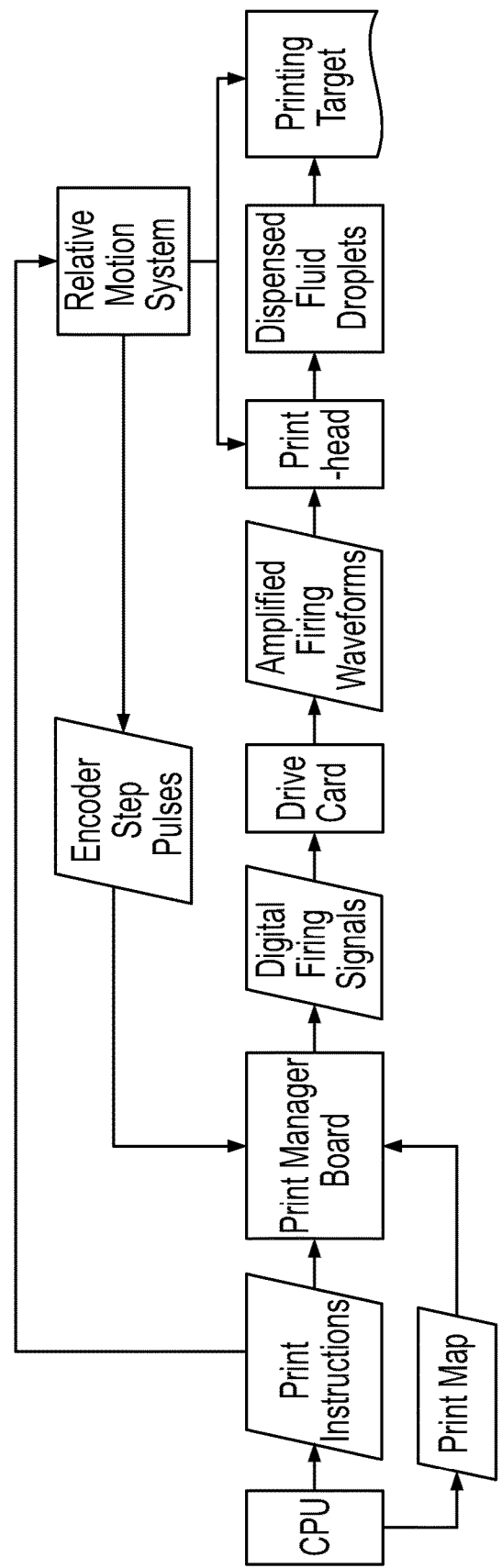

SYSTEMS AND METHODS FOR STAINING OF BIOLOGICAL SAMPLES

CROSS REFERENCE TO RELATED APPLICATIONS

The present disclosure claims the benefit of International Patent Application No. PCT/EP2017/076558, filed Oct. 18, 2017, and U.S. Provisional Patent Application No. 62/410,317, filed Oct. 19, 2016, both of which applications are incorporated by reference herein.

FIELD OF THE INVENTION

The present invention relates to systems and method for automated staining of biological samples, more particularly it relates to systems and methods for precise processing of cell and tissue samples in a manner that helps conserve both precious samples and reagents.

BACKGROUND OF THE INVENTION

Three major types of automated staining instruments are currently available, including dip and dunk strainers, puddle strainers and thin-film strainers. Each of these types of strainers are used to impart contrast to and permit localization of cellular structures (for example, nuclei and cell membranes) and/or particular cellular components (for example, protein and a nucleic acid markers) prior to examination of a biological sample (hereinafter, "sample") for diagnostic purposes. Typically, a series of reagents are applied to the sample in order to prepare the sample for staining and possibly for sample archival purposes. For microscopic examination, a cell sample is typically mounted on a substrate such as a microscope slide and is processed thereon.

"Dip and dunk" stainers, which operate by successively immersing a microscope slide or rack of such slides into a series of reagent volumes (or baths), are suitable for high-throughput production of slides for examination. Control over the staining process is primarily based on length of time of immersion and staining reagent concentration in the baths, but, over time, the reagent concentrations in dip and dunk baths will change due to uptake of reagent by samples and degradation of the reagents in the baths, which are typically left exposed to air. Furthermore, transfer of reagent from one bath to another also contributes to changes in concentration of reagents due to dilution and cross-contamination between reagents. Due to the difficulty in controlling reagent concentration, automated dip and dunk stainers are not well-suited for advanced staining protocols such as immunohistochemistry (IHC) and in-situ hybridization (ISH) protocols where concentration control is very important for providing staining consistency between samples. In addition, antibodies for IHC and nucleic acid probes for ISH protocols are far too expensive and precious to be applied in bulk quantities in the baths that are characteristic of dip and dunk stainers. Large amounts of waste are generated by dip and dunk strainers, further making them unattractive to laboratory personnel who must handle and dispose of such wastes, often according to strict environmental regulations.

Puddle staining technology operates by dispensing sufficient reagent to a cell sample mounted on a horizontally disposed microscope slide such that the sample is covered by the a "puddle" of reagent and then left to incubate for some pre-determined period of time, either with or without some effort to mix the reagent such as by swirling the reagent puddle with jets of compressed air. Once the reagent has been in contact with the sample for the predetermined amount of time, the slide is typically rinsed to remove the reagent so that a new reagent can be applied. In some instances, the slide must be rinsed multiple times during a particular staining protocol to ensure that a first reagent is completely removed before a second, potentially incompatible reagent is applied to the sample. Puddle technology has enabled a wide array of advanced IHC and ISH staining protocols to be automated. Nonetheless, reagent volumes sufficient to cover a typical tissue sample with a puddle are significant and some amount of reagent is wasted as it remains unreacted with the sample. Furthermore, when rinse volumes are factored in, the amount of waste that can be generated by a puddle stainer for a given staining protocol can be significant and disposal remains a burden for laboratory personnel.

"Thin-film" stainers seek to reduce reagent volumes and conserve precious reagents by constraining reagents to a capillary space between a microscope slide surface and a second surface such as a cover tile or cover slip. Depletion of reagents within the capillary space caused by location dependent uptake of reagents by the sample can lead to concentration gradients, which in turn lead to inconsistent staining across a sample which can lend uncertainty to analysis of staining patterns. Mixing can to some extent alleviate staining gradients by providing replenishment of reagent to depleted regions, but this approach often complicates stainer design.

A more recent approach to conservation of precious reagents is through the use of microfluidic applicators to apply staining reagents to small areas of a sample. For example, Pepper et. al (Journal of Histology, 34:3, pp 123-131, 2011) disclose use of thermal inkjet printing for histological staining. Another example of a microfluidic applicator is disclosed by Lovchik et al. ($15^{th}$ Int. Conf. on Miniaturized Systems for Chemistry and Life Sciences, Oct. 2-6, 2011, pp 368-370, incorporated by reference herein). deparaffinization PCT Application No. PCT/EP2016/058801, which is incorporated by reference herein to the extent it is not inconsistent with the present disclosure, discloses systems and methods that leverage directed microfluidic reagent application of reagents to samples and provides a significant step toward realizing such integrated systems. In brief, primary staining compositions and large molecule reagent compositions for droplet on-demand application are provided. Also disclosed are methods for staining a tissue sample by positioning a droplet-on-demand print head (e.g. an inkjet print head or other droplet dispensing means) in proximity to a portion of the tissue sample and dispensing predetermined amounts of the staining reagent from the print head and onto the portion of the tissue sample at a predetermined velocity, which can be done multiple times while monitoring the process. For example, by measuring a staining intensity on a sample, dispense of reagent can be repeated if the measured staining intensity does not meet a predetermined threshold. Dispenses can be done with or without an overlying fluid layer.

SUMMARY OF THE INVENTION

Disclosed herein are systems and methods that enable fully automated staining of a wide variety of sample types (for example, frozen tissue sections, paraffin embedded tissue sections, hematology and cytology samples) mounted on substrates (such as microscope slides) that take full advantage of microfluidic reagent dispensers to preserve precious reagents while also realizing more complete control over the staining process in a manner that helps preserve tissue morphology, further conserve precious reagents, and, in certain embodiments, extract additional diagnostic information from a sample.

It is believed that prior approaches do not address the application of less precious bulk reagents (such as rinse reagents, buffers and deparaffinization reagents) that are needed to prepare most or all of a sample for initial and subsequent applications of staining reagents, do not adequately provide for protection of tissue during processing, and are unsuitable for automatically preparing samples for coverslipping. In view of this, and as noted above, the present disclosure provides an integrated method and system that facilitates a greater degree of automation of overall staining processes while still conserving precious reagents and reducing waste. Also needed are a method and system that not only helps preserve precious reagents but also makes better use of precious biological samples in providing additional diagnostic information.

In one aspect of the present disclosure is a system including a microfluidic reagent applicator, a bulk fluid applicator, a fluid aspirator, a sample substrate holder, at least one relative motion system, and a control system. In another embodiment, the system further includes a sample imaging system. In particular embodiments, the bulk fluid applicator and fluid aspirator are combined in a single unit of the system. In more particular embodiments, the microfluidic reagent applicator, the bulk fluid applicator and the fluid aspirator are combined into a single unit of the system. In other even more particular embodiments, a first bulk fluid applicator can be a microfluidic reagent applicator and, in some embodiments, a second bulk fluid applicator is included in the system. Such a second bulk fluid applicator can further be combined with a fluid aspirator into a single unit of the system. In even more particular embodiments, where a bulk fluid applicator and a bulk fluid aspirator are combined into a single unit, an aperture of the bulk fluid applicator and an aperture of the bulk fluid aspirator are separated by a distance of at least 0.1 mm, for example, by a distance of at least 0.5 mm, such as a distance of at least 1.0 mm.

In another aspect of the present disclosure is a method including obtaining an image of a sample on a substrate, locating the position of the sample on the substrate, moving the microfluidic reagent applicator, the bulk fluid applicator, or both to a location on the substrate where the sample is positioned. In one embodiment, the method includes dispensing the bulk fluid to the location on the substrate where the sample is positioned, and removing the bulk fluid from the location on the substrate where the sample is positioned. In a particular embodiment, the sample is a paraffin-embedded tissue sample and locating the position of the sample on the substrate comprises detecting the portion of a paraffin section that contains the sample, and dispensing the bulk fluid to substantially only the portion of the paraffin section where the sample is positioned within the paraffin section. In a more particular embodiment, the bulk fluid comprises a deparaffinization reagent. In this manner, a well in the non-polar paraffin that surrounds the sample can be produced and can be used to retain water, aqueous solutions (such as a buffer, an antibody solution or a nucleic acid solution) and other polar reagents (such as a humectant) over the sample.

In more particular embodiments, the sample is a paraffin-embedded tissue or cell sample and the method further includes selecting two or more separate portions of the location where the sample is positioned on the substrate and applying a deparaffinization fluid using the bulk fluid applicator to the selected two or more separate portions of the location where the sample is positioned to produce two or more wells in the paraffin that are located over the two or more separate selected portions of the location where the sample is positioned. In even more particular embodiments, the method further includes simultaneously applying a deparaffinization fluid to a selected one of the two or more separate portions of the location where the sample is positioned and removing the deparaffinization fluid from the sample using a fluid aspirator. Advantageously, the bulk fluid applicator and the fluid aspirator are combined in a single unit and are moved together to simultaneously dispense and remove the deparaffinization fluid, thereby quickly removing the paraffin from a selected portion of the sample.

In some embodiments, it is possible to extend a separation distance between an aperture of a bulk fluid applicator and an aperture of a fluid aspirator to at least 1.0 mm and beyond (such as up to 10 mm, up to 20 mm, up to 30 mm or more, for example up to 100 mm, up to 200 mm, up to 300 mm or more, such as up to 1 cm) and still maintain connected fluidic flow between the applicator aperture and the aspirator aperture. In a particular embodiment, the bulk fluid applicator and the fluid aspirator can be a pair of needles that are separated from one another (by, for example, from about 1 mm to about 100 mm, such as from about 2 mm to about 50 mm or from about 3 mm to about 10 mm) and connected fluid flow can be maintained between the two needles to form a "fluid knife." Thus, for example, a fluid knife can be moved across a sample to selectively deparaffinize all or a portion of a paraffin-embedded tissue sample. In more particular embodiments, such a fluid knife can be used to prepare a generally square or rectangular well over a selected portion of a sample, into which further reagents can be deposited and removed according to a staining protocol. In even more particular embodiments, a pair of needles can be rotated around a central axis to form a rotating liquid knife, which if used to apply and remove a deparaffinization fluid, can be used to prepare a circular well over a selected portion of a sample. In either case, individual wells can be formed over selected portions of a sample such that different diagnostic assays can be performed on a single sample in these separate wells, and thereby additional diagnostic information can be obtained from a single precious sample.

In another aspect of the present disclosure is a system where at least two adjacent microfluidic dispenser ports of a single microfluidic reagent dispenser are in fluidic communication with at least two separate reagent reservoirs of a microfluidic reagent dispenser. For example, in a matrix of microfluidic dispenser ports of a piezo-electric ink jet printer head or a thermal ink jet printer head, alternating rows or alternating columns of the matrix are in fluid connection to the at least two separate reagent reservoirs of the microfluidic reagent dispenser. In an alternative embodiment, alternating microfluidic dispenser ports within one or more rows or columns of a matrix of microfluidic dispenser ports of a piezo-electric ink jet printer head or a thermal ink jet printer head may be in fluidic communication with the at least two separate reagent reservoirs of the microfluidic dispenser. In some embodiments, it is also possible to have at least two or more different subsections of a matrix of microfluidic dispenser ports of a piezo-electric ink jet printer head or a thermal ink jet printer head in fluid connection with at least two or more separate reagent reservoirs. In other embodiments, particularly where reagents are compatible with one another (such as primary, secondary and detection system antibodies and reagents), valves can control which reagents are delivered to a matrix of microfluidic dispenser ports in succession according to a given staining protocol.

In another aspect of the present disclosure is a method where at least two staining reagents are deposited onto substantially the same location on a tissue sample either sequentially or simultaneously such that they are in contact with the sample at the same time. Even normally incompatible reagents can be dispensed simultaneously or in rapid succession from separate microfluidic reagent dispensers (or separate microfluidic dispenser ports of a single microfluidic reagent dispenser) onto a sample. For example, both hematoxylin and eosin (H&E) can be deposited onto a sample together to significantly shorten the time needed to prepare an H&E stained sample.

In another aspect of the present disclosure is a non-transitory computer-readable medium for the automated treatment of at least a portion of a sample held on a substrate, the memory comprising instructions for (a) obtaining an image of the sample on the substrate; (b) automatically locating a position of the sample on the substrate; and (c) applying a fluid to the position of the sample on the substrate.

Overall, the disclosed systems and methods represent an improvement to the development, quality, and patient safety processes involved within the histology tissue staining industry. In some embodiments, the reagent deposition device is configured to enable any reagent dispensed to penetrate a thin boundary layer of fluid and replenish staining reagents in communication with the sample. Without wishing to be bound by any particular theory, it is believed that current staining technology relies upon puddles of staining reagents which passively diffuse down a concentration gradient into the tissue sample. In these staining systems, which are believed to lack active mixing of the reagent at the puddle-tissue interface, stain diffusion into tissue is mediated by the buildup of a stain concentration depletion layer at the interface, limiting staining kinetics. The present disclosure is believed to improve upon prior art staining techniques by (i) creating staining films of a thickness approaching that of the depletion layer; and (ii) replenishing stain molecules in the depletion layer, thereby overcoming the limitations of passive stain diffusion.

BRIEF DESCRIPTION OF THE FIGURES

Further features and advantages of disclosed system and method will become apparent in view of the Detailed Description that follows, and through reference to the accompanying figures in which:

FIG. 10A is a schematic showing a front view of an embodiment of an integrated system including a microfluidic droplet-on-demand actuator, a bulk fluid applicator needle and a fluid aspirator needle.

FIG. 10B is a schematic showing a side view of an embodiment of an integrated system including a microfluidic droplet-on-demand actuator, a bulk fluid applicator needle and a fluid aspirator needle.

FIG. 10C is a schematic showing a bottom view of an embodiment of an integrated system including a microfluidic droplet-on-demand actuator, a bulk fluid applicator needle and a fluid aspirator needle.

FIG. 16 provides a schematic setting forth a general functional flowchart for the control of print operations in an inkjet printer.

FIG. 17 is a schematic illustrating an embodiment of an inkjet staining system control scheme.

DETAILED DESCRIPTION OF ILLUSTRATIVE EMBODIMENTS

Figure 1:
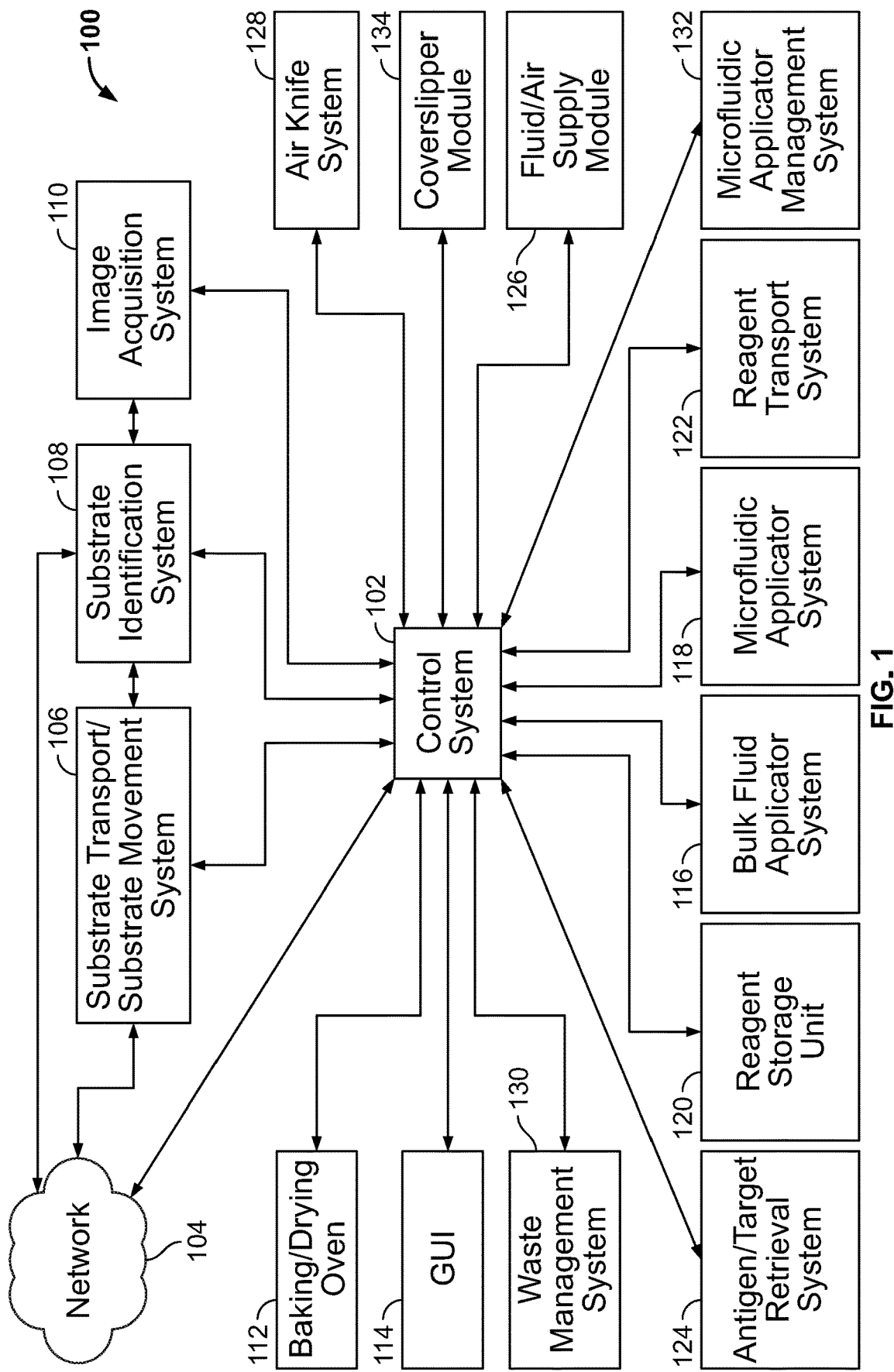
FIG. 1 is a schematic of an embodiment of the disclosed system.

As used herein, the singular terms "a," "an," and "the" include plural referents unless the context clearly indicates otherwise. Similarly, the word "or" is intended to include "and" unless the context clearly indicates otherwise.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary unless a particular order is clearly indicated by the context.

As used herein, the term "about" refers to plus or minus 1-10% of the referenced number, for example plus or minus 1-5% of the referenced number, such as plus or minus 1-2% the referenced number.

As used herein, the term "substantially" refers to at least 90%, for example at least 95%, such as at least 99% of the referenced object of the term.

As used herein, the term "antibody" refers to immunoglobulins or immunoglobulin-like molecules, including by way of example and without limitation, IgA, IgD, IgE, IgG and IgM, combinations thereof, and similar molecules produced during an immune response in any vertebrate, (e.g., in mammals such as humans, goats, rabbits and mice) and antibody fragments (such as F(ab')2 fragments, Fab' fragments, Fab'-SH fragments and Fab fragments as are known in the art, recombinant antibody fragments (such as sFv fragments, dsFv fragments, bispecific sFv fragments, bispecific dsFv fragments, F(ab)'2 fragments, single chain Fv proteins ("scFv"), disulfide stabilized Fv proteins ("dsFv"), diabodies, and triabodies, and camelid antibodies that specifically bind to a molecule of interest (or a group of highly similar molecules of interest) to the substantial exclusion of binding to other molecules. Antibody further refers to a polypeptide ligand comprising at least a light chain or heavy chain immunoglobulin variable region which specifically recognizes and binds an epitope of an antigen. Antibodies may be composed of a heavy and a light chain, each of which has a variable region, termed the variable heavy (VH) region and the variable light (VL) region. Together, the VH region and the VL region are responsible for binding the antigen recognized by the antibody. The term antibody also includes intact immunoglobulins and variants and portions thereof.

As used herein, the term "antigen" refers to a compound, composition, or substance that may be specifically bound by the products of specific humoral or cellular immunity, such as an antibody molecule or T-cell receptor. Antigens can be any type of molecule including, for example, haptens, simple intermediary metabolites, sugars (e.g., oligosaccharides), lipids, and hormones as well as macromolecules such as complex carbohydrates (e.g., polysaccharides), phospholipids, nucleic acids and proteins.

As used herein, the terms "biological sample" or "sample" refer to any solid or fluid sample obtained from, excreted by or secreted by any living organism, including without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as cancer). In particular, a sample can be suitable for histochemical or cytochemical analysis, such as samples that preserve the morphological characteristics of the cells and/or tissues to be analyzed. For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ. In some examples, a biological sample is a nuclear extract. In certain examples, a sample is a quality control sample. In other examples, a sample is a test sample. For example, a test sample is a cell, a tissue or cell pellet section prepared from a biological sample obtained from a subject. In an example, the subject is one that is at risk of or has acquired a disease. Samples can be prepared using any method known in the art by of one of ordinary skill. The samples can be obtained from a subject for routine screening or from a subject that is suspected of having a disorder, such as a genetic abnormality, infection, or a neoplasia. The described embodiments of the disclosed method can also be applied to samples that do not have genetic abnormalities, diseases, disorders, etc., referred to as "normal" samples. Samples can include multiple targets that can be specifically bound by one or more detection probes. In a particular example, the sample is a tissue section cut from a block of paraffin-embedded tissue placed onto (and possibly baked onto) a microscope slide. In another particular example, the sample is a cytology or hematology sample prepared by depositing the cells onto a microscope slide (such as by forming a smear, by contact with a filter onto which cells where collected, or by printing the cells in a pattern across the surface of the microscope slide).

As used herein, the terms "drop-on-demand," "droplet-on-demand", or "droplet-based" (and other like terms or phrases) refer to a staining technology that deposits discrete droplets of reagent onto the target sample, as opposed to "flooding" the slide or sample thereon with reagent. In some embodiments, the droplet-on-demand technology utilizes inkjet technology or piezoelectric technology. In some embodiments disclosed herein, the droplet dispensing technology is facilitated using an inkjet print head or like technology.

As used herein, the term "humectant" refers to a hygroscopic substance used to keep a substance, e.g. a tissue sample, moist; it is the opposite of a desiccant. It is often a molecule with several hydrophilic groups, most often hydroxyl groups; however, amines and carboxyl groups, sometimes esterified, can be encountered as well (its affinity to form hydrogen bonds with molecules of water is the crucial trait). It is believed that a humectant attracts and retains the moisture in the air nearby via absorption, drawing the water vapor into and/or beneath the organism/object's surface. By contrast, desiccants also attract ambient moisture, but adsorb—not absorb—it, by condensing the water vapor onto the surface, as a layer of film. In the context of inkjet deposition or like technologies, a humectant may be important for maintaining a viable nozzle. In some embodiments, it is important for keeping the tissue sample or biological sample hydrated during thin film processing.

The term "inkjet" in this disclosure refers to the family of drop-on-demand technologies where a piezoelectric (or thermal) element is used to actuate a droplet from a dispense manifold. This may include direct and non-contact methods common to the commercial printing industry or those used outside of the commercial printing industry.

As used herein, the term "immunohistochemistry" refers to a method of determining the presence or distribution of an antigen in a sample by detecting interaction of the antigen with a specific binding agent, such as an antibody. A sample is contacted with an antibody under conditions permitting antibody-antigen binding. Antibody-antigen binding can be detected by means of a detectable label conjugated to the antibody (direct detection) or by means of a detectable label conjugated to a secondary antibody, which binds specifically to the primary antibody (indirect detection).

As used herein, the term "primary antibody" refers to an antibody which binds specifically to a target protein antigen in a tissue sample. A primary antibody is generally the first antibody used in an immunohistochemical procedure. Primary antibodies also include those antibodies conjugated to another molecule (e.g. a label, hapten, etc.). Primary antibodies may serve as "detection probes" for detecting a target within a tissue sample.

As used herein, the term "primary stain" is a dye or like molecule that enhances contrast in a tissue sample. In some embodiments, the primary stain is one which directly "labels" a biological structure within or on a cell, without the employment of a specific binding agent, such as an antibody. Some examples of primary stains include hematoxylin and eosin. Other examples of primary stains include acridine orange, bismark brown, carmine, coomassie blue, cresyl violet, crystal violet, DAPI ("2-(4-Amidinophenyl)-1H-indole-6-carboxamidine"), Ethidium bromide, acid fucsine, Hoechst stains (Hoechst 33342 and Hoechst 33258, which are a bis-benzimidazole derivatives), iodine, malachite green, methyl green, methylene blue, neutral red, nile blue, nile red, osmium tetraoxide, rhodamine, and safranine. Other examples of primary stains include those stain used to stain bacteria (Gram-positive or Gram-negative stains), stains used to identify endospores (endospore staining), stains used to help identify species of Mycobacterium tuberculosis (Ziehl-Neelsen stain), Papanicolaou staining kits (which use a combination of haematoxylin, Orange G, eosin Y, Light Green SF yellowish, and sometimes Bismarck Brown Y), Periodic acid-Schiff stains ("PAS stains"), silver stains, etc. Yet other non-limiting primary stains include (i) histologic stains to selectively demonstrate Mycobacterium and other acid fast organisms or components (e.g. the AFB III Staining Kit, available from Ventana Medical Systems Inc., (hereinafter Ventana; Tucson, Ariz., USA) A); (ii) histologic stains to differentiate acid mucin from neutral polysaccharides (e.g. the Alcian Blue for PAS, also available from Ventana); (iii) histologic stain sto demonstrate weakly acidic mucopolysaccharide (e.g. Alcian Blue Staining Kit, also available from Ventana); (iv) histologic stains for Helicobacter pylori (e.g. Alcian Yellow Staining Kit, also available from Ventana); (v) histologic stains to selectively demonstrate amyloid (e.g. Congo Red Staining Kit, also available from Ventana); (vi) histologic stains to differentiate acid mucin from neutral polysaccharides (e.g. Diastase Kit, also available from Ventana); (vii) histologic stains to demonstrate elastic fibers in tissue sections (e.g. Elastic Staining Kit, also available from Ventana); (viii) histologic stains to differentiate leukocytes in bone marrow and other hematopoietic tissue (lymph nodes) (e.g. Giemsa Staining Kit, also available from Ventana); (ix) histologic stains to demonstrate polysaccharides in the cell walls of fungi and other opportunistic organisms, including, but not limited to, stains able to distinguish pathogenic fungi such as Aspergillus and Blastomyces1 and other opportunistic organisms such as Pneumocystis carinii (e.g. GMS II Staining Kit, also available from Ventana); (x) histologic stains to demonstrate gram-negative and gram-positive bacteria (e.g. Gram Staining Kit, also available from Ventana); (xi) histologic stains used to study connective tissue, muscle and collagen fibers (e.g. Green for Trichrome, also available from Ventana); (xii) histologic stains to detect iron pigment in bone marrow, tissue with hemochromatosis, and hemosiderosis (e.g. Iron Staining Kit, also available from Ventana); (xiii) histologic stains to demonstrate capillary basement membrane (e.g. Jones H&E Staining Kit or Jones Light Green Staining kit, both also available from Ventana); (xiv) histologic stains for detection of fungus (e.g. Light Green for PAS, also available from Ventana); (xv) histologic stains to detect acid mucopolysaccharides (mucin) (e.g. Muciarmine Staining Kit, also available from Ventana); (xvi) histologic stains used to demonstrate the presence of glycogen, including stains that may assist in the identification of positive reticular fibers, basement membrane, fungus, and neutral mucopolysaccharides, or those stains that may aid in distinguishing a PAS positive secreting adenocarcinoma from an undifferentiated PAS negative squamous cell carcinoma (e.g. PAS Staining Kit, also available from Ventana); (xvii) histologic stains to demonstrate reticular fiber (e.g. Reticulum II Staining Kit, also available from Ventana); (xviii) histologic stains used to study specific argyrophilic microorganisms (e.g. Steiner II Staining Kit, also available from Ventana); (xix) histologic silver stains to aide in the identification of the causative organisms of diseases such as some gastric ulcers (H. pylori), Lyme disease, Legionnaire's disease, cat scratch fever, etc. (e.g. Steiner Staining Kit, also available from Ventana); (xx) histologic stains to study connective tissue, muscle and collagen fibers (e.g. Trichrome II Blue Staining Kit, also available from Ventana); (xxi) histologic stains to study connective tissue, muscle and collagen fibers (e.g. Trichrome Staining Kit, Trichrome III Blue Staining Kit, or Trichrome III Green Staining Kit, each also available from Ventana). The skilled artisan will also recognize that there exist other primary stains, or for that matter dyes, that may be used in conjunction with the kits, methods, and compositions (e.g. primary stain compositions, reagent compositions) of the present disclosure.

As used herein, the term "reagent" may refer to any fluid deposited onto a tissue section or cytology sample, that is used in the context of a morphological (e.g. hematoxylin and eosin), immunohistochemical, or special stain. This includes, but is not limited to, oils, organics, and bridging reagents for removing wax (i.e. deparaffinization); washes, rinses, diluents, or buffers used to set reaction conditions, dilute reagents to an appropriate concentration, quench reactions, or wash away excess reactants; small molecule dyes used for morphological staining and special stains; antibodies, antibody conjugates, enzymes, multimers, amplifiers, chromogenic substrates, fluorescent detection chemistries, chemiluminescent substrates, and enzyme-reaction co-factors, used in IHC or ICC staining.

As used herein, "surfactants" are classified as anionic, cationic, or nonionic, depending on their mode of chemical action. In general, surfactants reduce interfacial tension between two liquids. A surfactant molecule typically has a polar or ionic "head" and a nonpolar hydrocarbon "tail." Upon dissolution in water, the surfactant molecules aggregate and form micelles, in which the nonpolar tails are oriented inward and the polar or ionic heads are oriented outward toward the aqueous environment. The nonpolar tails create a nonpolar "pocket" within the micelle. Nonpolar compounds in the solution are sequestered in the pockets formed by the surfactant molecules, thus allowing the nonpolar compounds to remain mixed within the aqueous solution. In some embodiments, the surfactant may be used to produce uniform spreading of reagents across a tissue section as well as decrease background staining.

As used herein, a "target" may be a particular tissue in a biological sample or a particular molecule or marker in a biological sample. Examples of the target include antigens (including haptens), antibodies, and enzymes. Further examples of targets include, generally, proteins, peptides, nucleic acids, sugars, and lipids. The reagents for use in the present disclosure may be those that are capable of converting the target materials present in the biological sample into detectable forms so that the localization of the targets can be detected (such as visually).

In one aspect of the present disclosure is an automated biological sample staining system including at least one microfluidic reagent applicator, at least one bulk fluid applicator, at least one fluid aspirator, and at least one sample substrate holder. In some embodiments, the automated biological sample staining system further includes at least one relative motion system to move one or more of the sample substrate holder(s), the microfluidic reagent applicator(s), the bulk fluid applicator(s), and fluid aspirator(s) together or separately in any combination. In some embodiments, the automated biological sample staining system further includes is a control system that is programmed to execute at least one staining protocol on a sample mounted on a substrate that is held in the sample substrate holder. In some embodiments, the system includes two or more microfluidic reagent applicators.

In some embodiments, the control system controls one or more of the at least one microfluidic reagent applicator, the at least one bulk fluid applicator, the at least one fluid aspirator, the at least one sample substrate holder and the at least one relative motion system to execute individual steps of the at least one staining protocol. In some embodiments, the control system can further control one or more auxiliary sub-systems that work in combination with the above components to treat the sample according to a particular staining protocol. The number of staining protocols stored in a memory (e.g. a non-transitory memory) of the control system as well as the instructions and parameters measured and/or applied to perform individual steps of a particular staining protocol is not limited, but rather is typically scaled according to the complexity of the overall system. Thus, in an embodiment for staining of an individual slide according to one particular staining protocol (such as a small system for rapid H&E staining of frozen tissue sections in a surgical suite) the number of instructions and parameters stored in the control system memory can be minimal. However, in complex systems that receive a variety of different types of samples to be treated according to a large plurality of staining protocols on separate substrate holders, the number of protocols, instructions, stored parameters, measured parameters, processing algorithms and the like can be as large as needed to reliably and repeatedly perform any number of staining protocols.

Examples of additional sub-systems that can be in communication with and controlled by the control system and/or moved by the at least one relative motion system include one or more of at least one sample imaging system, at least one air knife, at least one waste management system, and at least one sample identification system. Other examples of additional sub-systems include one or more reagent storage units (which can be cooled), one or more reagent transport systems, and one or more substrate transport systems. Further examples of additional sub-systems that can be in communication with and under control of a control system are described below with reference to FIG. 1.

In another embodiment, the at least one fluid aspirator is replaced with at least one air knife, which is used to facilitate the movement of fluids off of a sample using a compressed gas such as compressed air or nitrogen. For example, rather than aspirating fluids off of a sample and directing them to waste, fluids can be moved or otherwise "blown" off into a waste container or into a waste receiver that leads to a waste container.

In some embodiments, the various system components (e.g. those identified in FIG. 1) may be combined to form one or more reagent management units, each reagent management unit having the same or different configuration (e.g. by configuration, it is meant the types of system components, the number of system components, or the quantity of any single system component). In view of this, the systems disclosed herein may comprise one or more reagent management units, for example 1 or more reagent management units, 2 or more reagent management units, 3 or more reagent management units, or 4 or more reagent management units.

In some embodiments, the at least one bulk fluid applicator and the at least one fluid aspirator are combined into at least one of a first type of a reagent management unit. In other particular embodiments, at least one microfluidic reagent applicator, at least one bulk fluid applicator and at least one fluid aspirator are combined into at least one of a second type of reagent management unit. In other particular embodiments, at least one microfluidic reagent applicator, at least one bulk fluid applicator and at least one air knife are combined into at least one of a third type of reagent management unit. In an even more particular embodiment, at least one microfluidic reagent applicator, at least one bulk fluid applicator, at least one fluid aspirator, and at least one air knife is combined into at least one of a fourth type of a reagent management unit. Depending upon the system configuration the system can include any combination of two or more of the first type, the second type, the third type and the fourth type of reagent management units. In some embodiments, a reagent management unit can include for example, pumps, reservoirs, valves and the like, as well as a controller for controlling the same to deliver predetermined amounts of predetermined fluids. In some embodiments, the reagent management unit can further include other means for delivering one or more reagents, which reagents can be solid or liquid. For example, a reagent management unit can also include a reconstitution unit for dissolving solid reagents into solution for application to a sample. Alternatively, the reagent management unit could further include one or more single-dose reagent applicators such as blister packs and associated mechanisms for managing and dispensing the contents of the blisters into to contact with a sample.

In some embodiments, the at least one bulk fluid applicator and the at least one fluid aspirator comprise a pair of needles. In even more particular examples, the needles of the pair are separated by distance of at least 0.1 mm, for example, by a distance of at least 0.5 mm, such as a distance of at least 1.0 mm.

Regardless of the type (i.e. the selection and/or number of system components) of the at least one reagent management unit, the reagent management unit can be coupled to at least one relative motion system, or at least one sample substrate holder can be coupled to at least one relative motion system, or both at least one reagent handling unit and at least one sample substrate holder are coupled to at least one relative motion system. Depending upon the system configuration, the system can include any combination of couplings between different types of reagent management units, different sample substrate holders and different relative motion systems to provide relative motion between the respective components.

In some embodiments, the distance between an aperture of a bulk fluid applicator and an aperture of a bulk fluid aspirator can be at least 1.0 mm and beyond (such as up to about 10 mm, up to about 20 mm, up to about 30 mm or more, for example up to up to about 100 mm, up to about 200 mm, up to about 300 mm or more, such as up to about 1 cm) and still maintain connected fluidic flow between the applicator aperture and the aspirator aperture. In a particular embodiment as described above, the bulk fluid applicator and the bulk fluid aspirator can be a pair of needles that are separated from one another (by, for example, from about 1 mm to about 100 mm, such as from about 2 mm to about 50 mm or from about 3 mm to about 10 mm) and connected fluid flow can be maintained between the two needles to form a "fluid knife."

For example, and in some embodiments, a fluid knife can be moved across a sample through a relative motion to selectively deparaffinize all or a portion of a paraffin-embedded tissue sample. In more particular embodiments, such a fluid knife can be used to prepare a square or rectangular well over a selected portion of a sample, into which further reagents can be deposited and removed according to a staining protocol. In even more particular embodiments, a pair of needles can be rotated around a central axis to form a rotating liquid knife, which if used to apply and remove a deparaffinization fluid can be used to prepare a circular well over a selected portion of a sample.

In particular embodiments of the disclosed system, the at least one microfluidic reagent applicator comprises at least one micro-fabricated chip applicator such as described in Lovchik et al. (15$^{th}$ Int. Conf. on Miniaturized Systems for Chemistry and Life Sciences, Oct. 2-6, 201, pp 368-370, the disclosure of which is hereby incorporated by reference herein). In other particular embodiments, the at least one microfluidic reagent applicator comprises a droplet-on-demand actuator, which droplet-on-demand actuator can be, for example, a piezo-electric actuator or a thermal actuator. In more particular embodiments, the disclosed system can include any combination of two or more of a micro-fabricated chip applicator, a piezo-electric actuator and a thermal actuator. For example, a piezo-electric actuator might be chosen to dispense a fluid containing a reagent that is prone to degradation due to sheer forces or is thermally labile, whereas a micro-fabricated chip applicator or a thermal actuator might be chosen to dispense a fluid containing reagents that are not prone to degradation due to sheer forces or is not thermally labile, respectively. Degradation of a particular reagent can be determined by comparison with the staining performance of the particular reagent on a puddle or thin film staining system as described in the Background above.

In other particular embodiments, the microfluidic reagent applicator comprises an integrated reagent reservoir, such as one in fluidic connection with a droplet-on-demand actuator. In some embodiments, the microfluidic reagent applicator comprises a remote reagent reservoir, for example, a remote reagent reservoir in fluidic connection with a droplet-on-demand actuator. In still other particular embodiments, the microfluidic reagent applicator can comprise an exchangeable reservoir that is placed in fluidic connection with the microfluidic reagent applicator upon coupling of the two, such as a droplet-on-demand actuator and an exchangeable reagent reservoir that is placed in fluidic connection with the droplet-on-demand actuator upon coupling of the droplet-on-demand actuator and the exchangeable reagent reservoir. It is also possible that the microfluidic reagent applicator comprises an intermediate reagent reservoir that is in fluidic connection with and supplied by a remote reagent reservoir. For example, in a more particular embodiment, the microfluidic reagent applicator comprises a droplet-on-demand actuator integrated with an intermediate reagent reservoir that is in fluidic connection with a remote reagent reservoir.

The skilled artisan will appreciate that the disclosed system can include any combination of reservoir configurations, and/or any combination of bulk fluid applicators as described herein. For example, precious primary antibody and nucleic acid probes can be provided in microfluidic applicators that include an integrated reservoir, which microfluidic applicators can be moved in and out of a cooled reagent storage system and brought to a particular sample substrate holder when needed in a particular staining protocol. Alternatively, such precious reagents could be held in exchangeable reservoirs that are moved in and out of a cooled reagent storage system and coupled to a microfluidic reagent applicator such as a droplet-on-demand actuator. On the other hand, less precious reagents such as bulk fluids including rinse solutions, deparaffinization fluids and the like can be held in easily refillable remote reagent reservoirs and fluidically connected (such as through tubing and perhaps through an intermediate reservoir) with a microfluidic reagent applicator or a bulk fluid applicator. Similarly, reagents that are used in multiple staining protocols (for example, detection reagents such as secondary antibodies, tertiary antibodies, antibodies coupled to enzymes, enzyme substrates and the like) could be held in reservoirs in the vicinity of one or more sample substrate holders that are used for performing detection chemistries and fluidically connected directly or through tubing (and perhaps an intermediate reservoir) to one or more microfluidic reagent applicators. In a particular embodiment, all the different reagents used for a particular detection chemistry (such as di-aminobenzidine detection of primary antibody binding) are held in reservoirs fluidically connected to a single microfluidic reagent applicator (directly, through tubing, or through tubing and an intermediate reservoir) and are sequentially or simultaneously in any combination directed through the single microfluidic applicator and onto a sample. In more particular embodiments, at least two adjacent microfluidic dispenser ports of a single microfluidic reagent dispenser are in fluid connection to at least two separate reagent reservoirs of the microfluidic reagent dispenser. As described previously, for example, in a matrix of microfluidic dispenser ports of a piezo-electric ink jet printer head or a thermal ink jet printer head, alternating rows or alternating columns of the matrix are in fluid connection to the at least two separate reagent reservoirs of the microfluidic reagent dispenser. In another alternative embodiment, alternating microfluidic dispenser ports within one or more rows or columns of a matrix of microfluidic dispenser ports of a piezo-electric ink jet printer head or a thermal ink jet printer head are in fluid connection to the at least two separate reagent reservoirs of the microfluidic dispenser. In some embodiments, at least two or more different subsections of a matrix of microfluidic dispenser ports of a piezo-electric ink jet printer head or a thermal ink jet printer head in fluid connection with at least two or more separate reagent reservoirs. In still other embodiments, particularly where reagents are compatible with one another (such as primary, secondary and detection system antibodies and reagents), valves can control which reagents are delivered to a matrix of microfluidic dispenser ports in succession according to a given staining protocol.

Also disclosed herein is a method for the automated treatment of at least a portion of a sample held on a substrate, the method including obtaining an image of the sample on the substrate, automatically locating a position of the sample on the substrate, and applying a fluid to the position of the sample on the substrate. In one embodiment, applying the fluid to the position of the sample on the substrate comprises applying the fluid to substantially only the position of the sample on the substrate. In a particular embodiment, the method can further include removing the fluid from the location on the substrate where the sample is positioned. In a more particular embodiment, the sample comprises a paraffin-embedded sample and locating the position of the sample on the substrate comprises automatically detecting a portion of a paraffin section that contains the sample. In even more particular embodiments, the fluid comprises a deparaffinization fluid, and applying the fluid comprises applying the deparaffinization fluid to at least one sub-portion of the paraffin section that contains a sub-portion of the sample, and can further include removing the deparaffinization fluid from the at least one sub-portion of the paraffin section that contains a sub-portion of the sample to form a well in paraffin around the sub-portion of the sample. Alternatively, the fluid comprises a deparaffinization fluid, and applying the fluid comprises applying the deparaffinization fluid to substantially the portion of the paraffin section that comprises the sample, and can further include removing the deparaffinization fluid from substantially the portion of the paraffin section that comprises the sample leaving paraffin on the substrate around the sample to create a well in the paraffin substantially surrounding the sample. Application of the deparaffinization fluid and removing the deparaffinization fluid may, in some embodiments, be performed simultaneously.

Once a well (or several wells) is (are) formed around a sample (or one or more sub-portions of the sample), the method can further include dispensing at least one second fluid to the well (or wells) in the paraffin. Without wishing to be bound by any particular theory, it is believed that the well in the paraffin can have the advantage of confining a polar (such as aqueous) solution to the well since the hydrophobic paraffin forms a barrier to migration of the polar solution. For example, the second fluid can be one or more of water, a buffer, an antibody solution, a dye solution, a nucleic acid solution, a solvent, a surfactant, and a humectant into the well in the paraffin.

In more particular embodiments, the disclosed method includes selecting from the location of the sample on the substrate two or more separate sub-portions of the sample and applying the deparaffinization fluid to the two or more separate selected sub-portions of the sample to dissolve paraffin over the two or more separate selected sub-portions of the sample. In some embodiments, the method and can further include removing the deparaffinization fluid from the two or more separate sub-portions of the sample to form two or more separate wells in the paraffin around the two or more separate sub-portions of the sample. In an even more particular embodiment, the disclose method includes selecting two or more separate sub-portions from an image of an H&E stained serial section of the same sample block from which the sample was obtained. Since the H&E stained section of a serial section (meaning a section sliced by microtome or other means within one of just a few slices of the sample on which two or more separate sub-portions are selected) has roughly the same overall shape as the sample on which two or more separate sub-portions are selected, particular morphological features identified in an image of the H&E stained serial section can be identified and mapped (through image analysis techniques known in the art) to similar sub-portions of the sample and used to guide further treatment of the sample. For example, the two or more separate sub-portions of the sample mapped from the serial section are selected to coincide with different morphological features of the sample. In some embodiments, the two or more separate sub-portions of the sample mapped from the serial H&E section are selected to provide at least one of a positive control and a negative control and to provide at least one sub-portion of the sample for comparison to the at least one of the positive control and the negative control.

In another embodiment, a method is disclosed wherein at least two staining reagents are deposited onto substantially the same location on a tissue sample either sequentially or simultaneously. According to the embodiments of the present disclosure, even reagents that are considered incompatible with each other, such as hematoxylin and eosin, may advantageously be deposited together onto a sample from one or more microfluidic reagent dispensers, for example, from adjacent microfluidic dispenser ports or separate microfluidic reagent dispensers.

In some embodiments, real time dispense volume measurement data may be stored and collated with the slide specimen's identifier, and each dispenser's identifier affiliated with delivery of reagents to said specimen. This metadata may be stored onboard the instrument or host computer for tracking and reporting purposes in the histology lab. Dispense volume metadata can be tracked for the entire slide staining process history. In addition, continuous performance tracking per a dispenser's identifier can be collected during its lifecycle. For a given 'poor dispense,' the "failed" dispenser and affected specimen may be flagged, i.e. by software, and reported to the histologist through several electronic methods (i.e. led indicator, run report, etc.) to enforce patient safety. Dispense volume metadata may be collected into external data banks for research and development purposes. This data could be used to qualify and screen new staining kits, or individual staining products. In addition, dispense verification tracking can be used in newly developed reagents that may perform differently overtime and affect the dispense delivery of the reagent to the specimen slide (i.e. material compatibility with reagent and dispenser).

In some embodiments, the reagent, or composition comprising the reagent, is dispensed from a microfluidic reagent dispenser through an immiscible fluid with sufficient velocity to drive droplets of reagent through a thin film of tissue-preserving fluid medium. Examples of thin film fluids include, but are not limited to, draksol, linpar, mineral oil, or silicone oil. Generally, favorable attributes include a liquid state at room temperature (e.g. 20-30 degrees C.) low surface tension, and low vapor pressure. In some embodiments, it is believed that the immiscible barrier layer allows for the resupply of aqueous fluids through the barrier to a sample surface. The low surface tension allows for the barrier to be coated onto the sample as a relatively thin film (about 100 µm in height or less). It is further believed that the low vapor pressure ensures that the barrier layer will be slow to evaporate off of the sample. It is believed that this drives the reagent into a layer in communication with the sample below the immiscible fluid. For this embodiment, the kinetic energy (a product of the mass of the droplet and the impact velocity when the droplet hits the film) of the droplet should be greater than the surface tension/energy of the protective layer (plus, provide sufficient additional energy to account for displaced fluid), e.g. great than about $9.52 \times 10-10$ J. In some embodiments, the kinetic energy is about $6.23 \times 10-10$ J. Moreover, the Weber number of the droplet should be less than about 18 to ensure that droplet breakup does not occur on impact. In some embodiments, the droplet must have a higher density than the protective film to ensure that once the surface is broken, the droplet will continue through the protective layer to contact the sample directly.

In other embodiments, the reagent is dispensed into a pre-existing fluid "layer" with sufficient velocity that droplets of the reagent are driven into a thin film that will carry stain locally through the layer to a fluid-tissue stain depletion layer. It is believed that this facilitates the replenishment of reagent at the interfacial contact point in communication with the sample. In turn, it is believed that this eliminates the stain depletion boundary layer and improves the staining reaction kinetics which, in some cases, is mediated by the diffusion of staining reagent across the depletion layer. Indeed, for large biomolecules, such as antibodies, binding of the molecule to a target is driven by time and concentration. By continually disrupting the thin film with additional reagent material via dispensing with the presently disclosed device (and the attendant, inherent mixing), the effective concentration at the tissue surface is enhanced, and believed to provide for faster uptake. For this embodiment, the velocity generally ranges from about 5 m/s to about 15 m/s.

One embodiment of the disclosed automated biological staining system according to some embodiments of the present disclosure is shown in FIG. 1. System 100 includes control system 102 that is in communication with the various subsystems and can be in communication with network 104. Network 104 can further be in communication with the control systems of additional automated biological staining systems, a pathology laboratory workflow control and tracking system, and a Laboratory Information System (LIS) and/or a Hospital Information System (HIS). Orders for particular samples prepared in the pathology laboratory can be sent to control system 102 and stored in memory (not shown) of the control system until a sample arrives at system 100. For example, a particular sample positioned on a microscope slide can be directed toward System 100 by substrate transport/substrate movement system 106 (which could, for example, be 1-D or 2-transport system, such as a conveyor belt or a magnetic transport system). As the sample arrives at system 100 (either manually or automatically), substrate identification system 108 identifies the sample based on an identifier (such as a unique sample identifier) that is associated with the microscope slide (e.g. a bar-code label, a numeric identifier or an RFID tag) and control system 102 associates the particular sample with the order that specifies the processing steps (which can be stored in memory of the control system 102 or sent to the control system along with the order through network 104). Image acquisition system 110, which can also serve as part of the substrate identification system 108, images the sample (such as a paraffin-embedded tissue sample) and generates a map of the sample which can be used for processing the sample according to a particular protocol. The image can, for example, be displayed on GUI 114, and a user can interact (such as through a touch screen) with the control system 102 to control the movement and/or processing steps. GUI 114 can also be used, for example, to monitor the progress of a sample being process by system 100, display warnings and perform quality control checks.

Control system 102 can include known components, such as a processor, an operating system, system memory, memory storage devices, input-output controllers, input-output devices, and display devices. It may also include cache memory, a data backup unit, and many other devices. Examples of input devices include a keyboard, a cursor control devices (e.g., a mouse), a microphone, a scanner, and so forth. Examples of output devices include a display device (e.g., a monitor such as GUI 114 or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64-bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. Operating systems interface with firmware and hardware in a well-known manner, and facilitate the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random-access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an Internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the Internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

In one embodiment of the system 100 of FIG. 1, the sample is attached to a substrate holder (not shown in FIG. 1; examples of sample substrate holders that can be part of system 100 include heater bases, Peltier heating and cooling bases, and trays that hold multiple samples; in some embodiments, an entire tray of samples is loaded into system 100 by a user) and routed by substrate transport/substrate movement system 106 toward baking/drying oven 112 to firmly attach the sample to the microscope slide. In other embodiments, a sample is baked/dried externally to system 100 and is loaded directly onto a sample substrate holder by a user of the system 100. Alternatively, as will be described in more detail with regard to subsequent figures, the sample can be placed on a sample substrate holder and all systems needed to perform a particular staining protocol are moved to the sample using actuators associated with, for example, bulk fluid applicator system 116 or microfluidic applicator system 118. Reagents for use in fluid applicator system 116 or microfluidic applicator system 118 can in some embodiments be moved from reagent storage unit 120 using reagent transport system 122 and be fluidically connected to fluid applicator system 116 or microfluidic applicator system 118.

In some staining protocols, it may be desirable to perform antigen retrieval or target retrieval on the sample before further processing steps can be accomplished. In one embodiment, the sample is routed using substrate transport/substrate movement system 106 toward antigen/target retrieval system 124. Antigen//target retrieval system 124 can be, for example, an enclosed chamber that can be pressurized and heated to a temperature above the normal boiling point of water. Optionally, a bulk antigen retrieval solution can be supplied to antigen/target retrieval system 124 by fluid/air supply module 126. In some embodiments, the antigen/target retrieval system can be configured such that it is optimized for antigen retrieval (unmasking of antigens tissue prior to IHC) or for target retrieval (unmasking of nucleic acid sequences prior to ISH). In other embodiments, the disclosed antigen/target retrieval system 124 can include one or more dedicated antigen retrieval sub-systems and one or more dedicated target retrieval sub-systems.

Alternatively, an antigen retrieval solution and an overlying layer of a low volatility organic solvent can be applied by bulk fluid applicator system 116 to the sample and the sample is heated by a heater base that is part of the sample substrate holder, with or without stirring/mixing using gas jets or agitation such as vibration. As an alternative to an overlying layer of low volatility organic solvent, an opposable surface can be placed over the antigen retrieval solution, which opposable surface can help reduce evaporation, and in some embodiments, can be moved to mix the fluid covering the sample.

Following treatment with bulk fluids, in some embodiments it may be desirable to remove a bulk fluid from a sample using air knife system 128 and direct the fluid toward waste management system 130. Waste management system 130 can include one or more reservoirs for capturing waste fluids generated by different protocol steps of a given staining protocol. Waste management system 130 can also include mechanisms for treating, separating and/or filtering waste fluids.

As illustrated in FIG. 1, the microfluidic applicator management system 132 is provided to ensure that microfluidic applicator system 118 remains functional. For example, microfluidic applicator management system 132 could comprise a washing station or simply be a place where microfluidic applicator system 118 can be moved when not in use to ensure that a microfluidic reagent applicator (not shown in FIG. 1) of microfluidic applicator system 118 does not dry out and clog between uses.

A coverslipper module 134 can further be part of system 100 to place coverslips over samples once they have completed their processing protocol.

Figure 2:
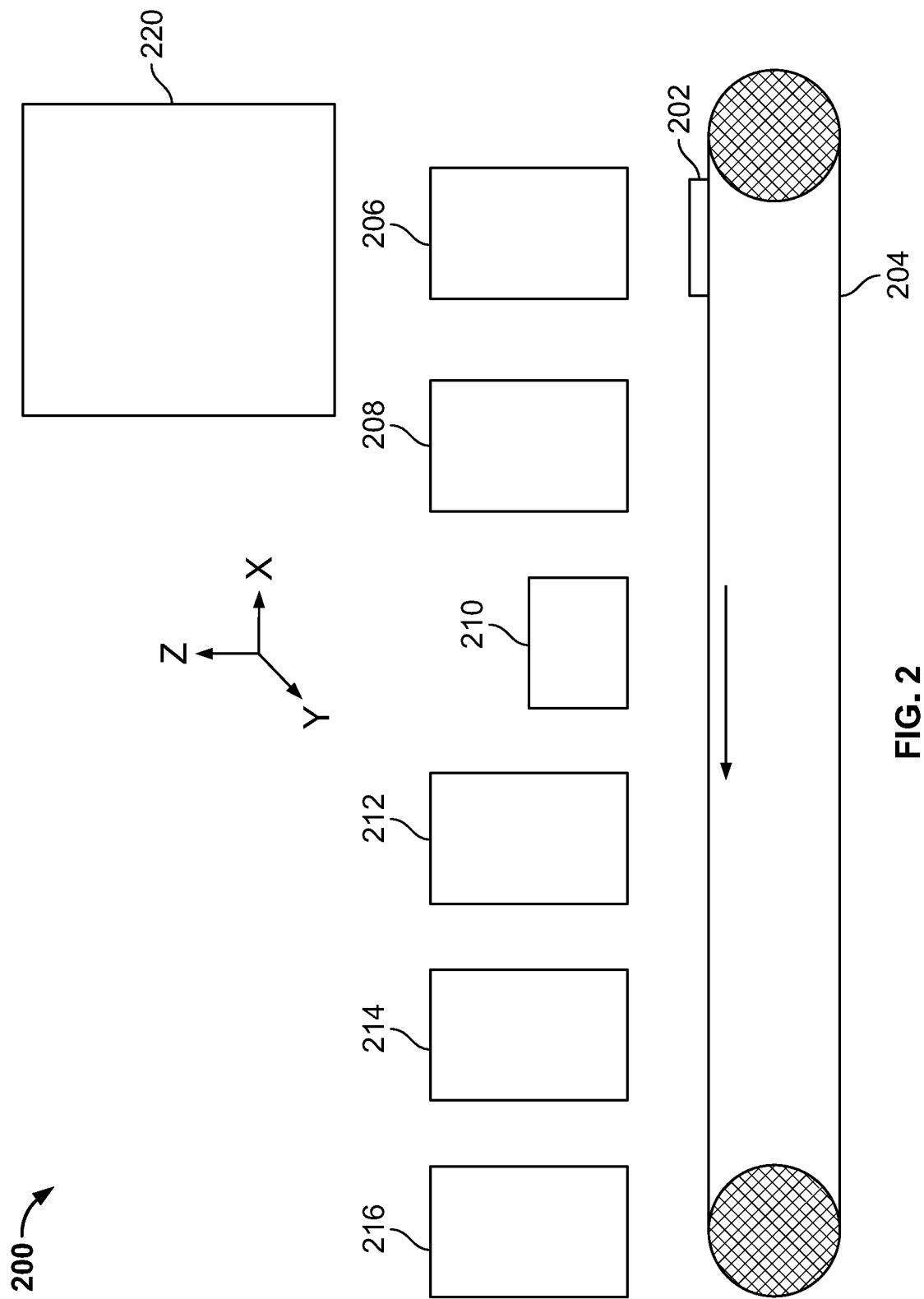
FIG. 2 is a schematic of another embodiment of the disclosed system including a conveyor and a plurality of modules for treating a sample according to a staining protocol.

FIG. 2 shows an embodiment of the disclosed system 200 wherein a sample bearing substrate 202 is moved successively past processing modules 206, 208, 210, 212, 214, and 216 on conveyor 204. Modules 206, 208, 210, 212, 214, and 216 are used to process the sample, i.e. the modules may be used to perform one or more process steps needed for a particular staining protocol. In some embodiments, at least one of processing modules 206, 208, 210, 212, 214, and 216 includes a microfluidic reagent applicator and at least one of processing modules 206, 208, 210, 212, 214, and 216 includes a bulk fluid applicator. In one embodiment, at least one of processing modules 206, 208, 210, 212, 214, and 216 is held stationary such that conveyor 204 provides relative motion of the sample past the at least one processing module (either continuously at a constant rate, at a variable rate, or in a stop-start manner). In another embodiment, at least one of the processing modules 206, 208, 210, 212, 214, and 216 is connected to an actuator (not depicted) that can provide relative motion in any combination of the x, y and z coordinate directions. For example, in a particular embodiment, conveyor 204, operates in a stop-start fashion under control of control system 102 to bring the sample bearing substrate 202 successively into the vicinity of the processing modules 206, 208, 210, 212, 214, and 216, and once the sample bearing substrate is positioned in the vicinity, the actuator moves the processing module relative to the substrate to apply one or more fluids to the sample. In other particular embodiments, at least one of the processing modules 206, 208, 210, 212, 214, and 216 includes a fluid aspirator, in other particular embodiments at least one of the processing modules includes an air knife, and in still other particular embodiments at least one of the processing modules includes two or more of a bulk fluid applicator, a microfluidic reagent applicator, a fluid aspirator, and an air knife. Any of processing modules 206, 208, 210, 212, 214, and 216 can be moved to reagent storage unit 220 when not in use.

Figure 3:
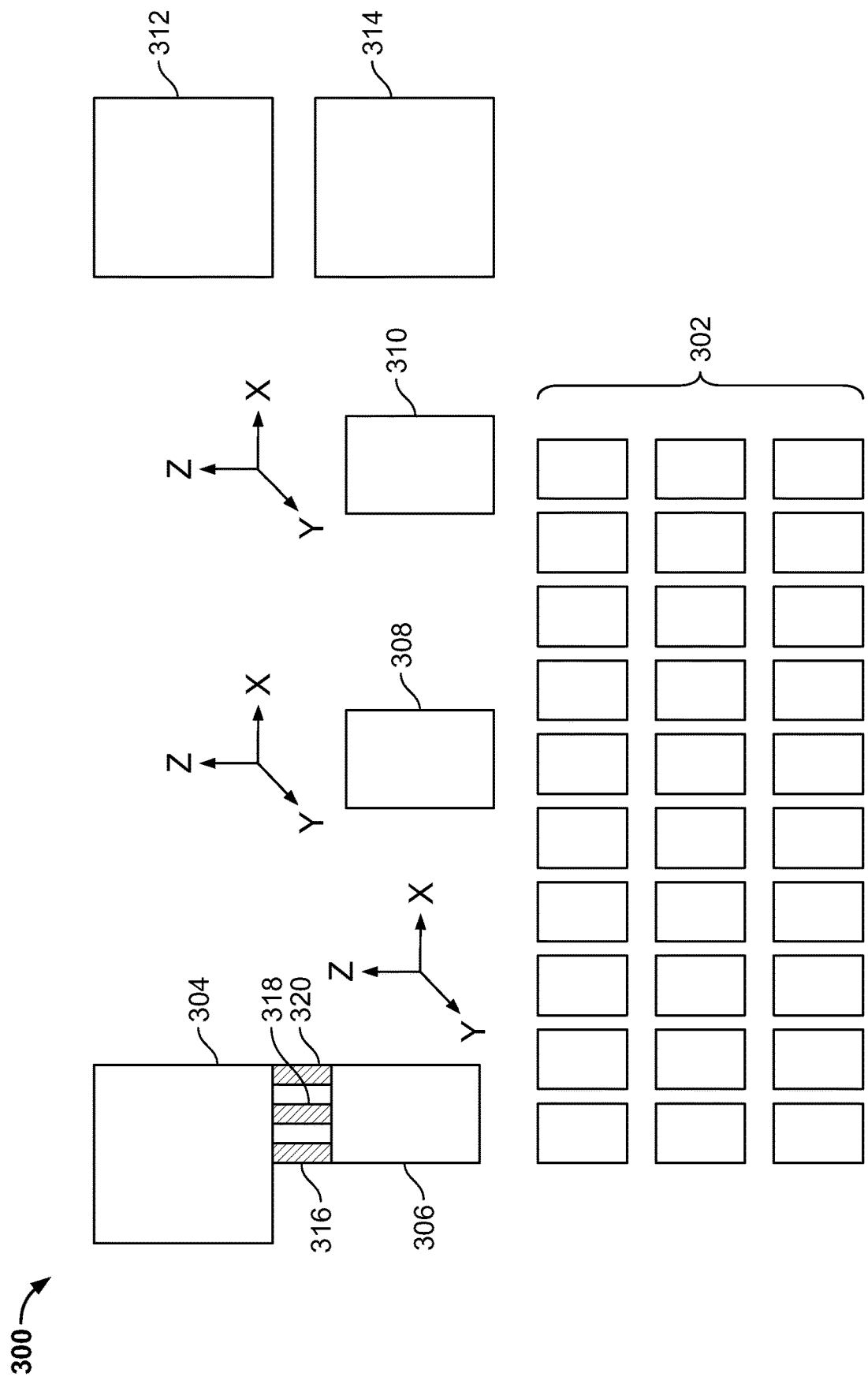
FIG. 3 is a schematic of another embodiment of the disclosed system including an array of stationary sample substrate holders and moveable sample processing modules.

FIG. 3 shows a schematic of an embodiment of the disclosed system 300 that includes an array of stationary sample substrate holders 302 and a plurality of processing modules 304/306, 308, and 310. Also shown are reagent storage module 312 and microfluidic applicator management system 314. In this embodiment, processing module 304/306 comprises a bulk fluid application system wherein bulk fluid applicator module 306 is fluidically connected to fluid/air/vacuum supply module 304 through one or more flexible fluidic connections 316, 318, and 320. In a particular embodiment, flexible fluidic connections 316, 318, and 320 provide respectively, bulk fluids, air and vacuum to bulk fluid applicator module 306. In more particular embodiments, fluid/air/vacuum supply module 304 includes multiple bulk fluid reservoirs that can be switched to supply different fluids to bulk fluid applicator module 306. In other more particular embodiments, flexible fluidic connections 318, and 320 supply compressed air to an air knife mounted on bulk fluid applicator module 306 and vacuum to a fluid aspirator mounted on bulk fluid applicator module 306.

Figure 8:
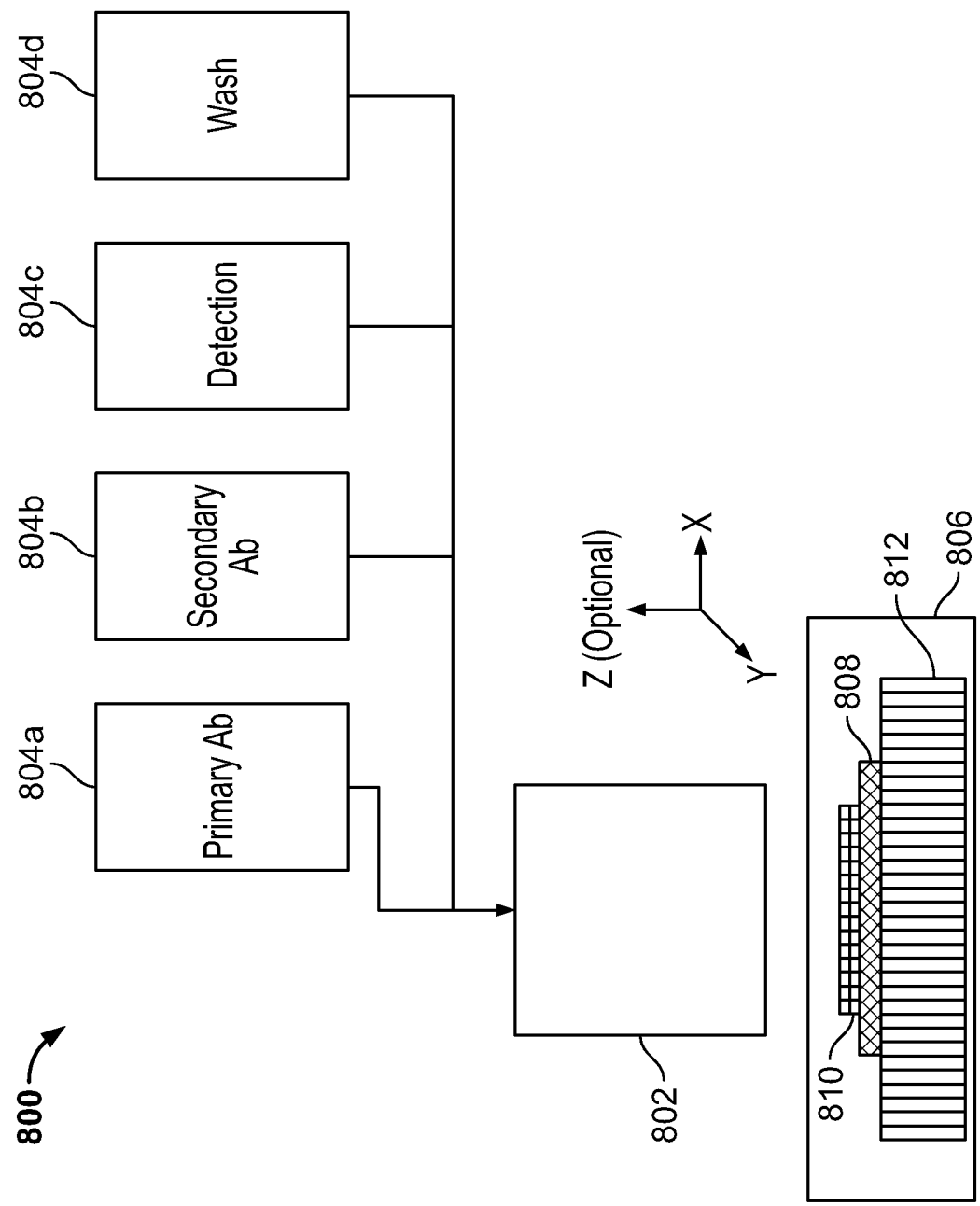
FIG. 8 is a schematic showing how multiple reagent reservoirs can be used with a single droplet-on-demand actuator head according to a particular embodiment of the disclosed system.

In some embodiments, and again with reference to FIG. 3, processing module 308 comprises a microfluidic reagent applicator dedicated to providing detection chemistry reagents to samples mounted on sample substrate holders within array 302, and processing module 310 provides a reagents, e.g. primary antibodies. In this embodiment, processing module 310 moves to reagent storage module 312 (which can be cooled and/or humidified) to retrieve a microfluidic reagent applicator including an integrated reagent reservoir corresponding to a primary antibody that according to a scheduled staining protocol is to be applied to a particular sample in the array. Once the dispensing of the primary antibody is completed, the applicator is returned to reagent storage module 312, perhaps after being sent to microfluidic applicator management system 314 for cleaning/blotting or humidification (such as by application of a humectant). Processing module 308 in this embodiment can include a single microfluidic reagent applicator fluidically connected to a plurality of integrated reagent reservoirs, such as is shown in FIG. 8.

In other embodiments, and again with reference to FIG. 3, sample substrate holder array 302 can be an array, such as a 1×n, 2×n, 3×n up to an n×n array, for example a 1×20 array, a 2×15 array or a 3×10 array in order to provide for a total of 30 sample substrate holders. The system can have other numbers of sample substrate holders, such as from 5 to 200 substrate holders, and these can be arranged in any possible array to reach the total number of sample substrate holders. Some or all of the substrate holders can comprise a heater base or a Peltier heating/cooling base.

Figure 4A:
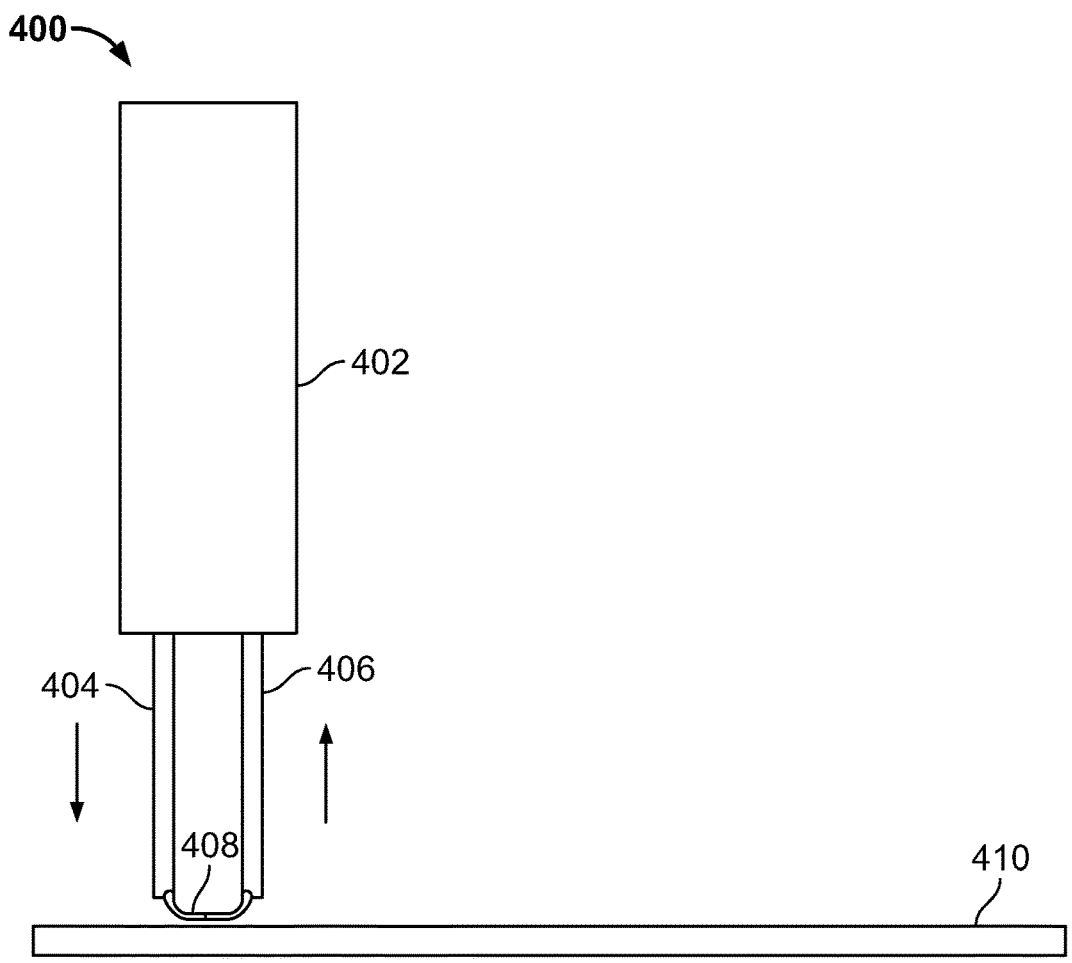
FIG. 4A is a diagram showing a first embodiment of a combined bulk fluid applicator and fluid aspirator module.

FIG. 4A shows an embodiment of a bulk fluid applicator module 400 that includes body 402 (which can include a reservoir, and intermediate reservoir, or simply provide fluidic coupling to a bulk fluid/vacuum supply module; not shown), bulk fluid applicator needle 404 and fluid aspirator needle 406, which when used together can form fluid knife 408 between the needles. The entire bulk fluid applicator module can be moved across a sample bearing substrate 410 according to disclosed methods to treat all or a portion of the sample.

Figure 4B:
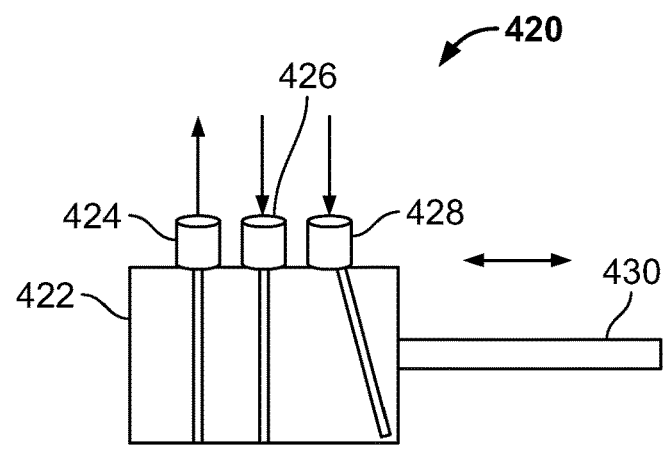
FIG. 4B is a diagram showing a second embodiment of a combined bulk fluid applicator and fluid aspirator module that further includes an air knife.

FIG. 4B shows a second embodiment of a bulk fluid applicator module 420 that includes body 422, vacuum nozzle 424, bulk fluid applicator nozzle 426, and air knife nozzle 428. The entire module 420 can be moved across all or part of the sample bearing substrate 410 using actuator 430.

Figure 5B:
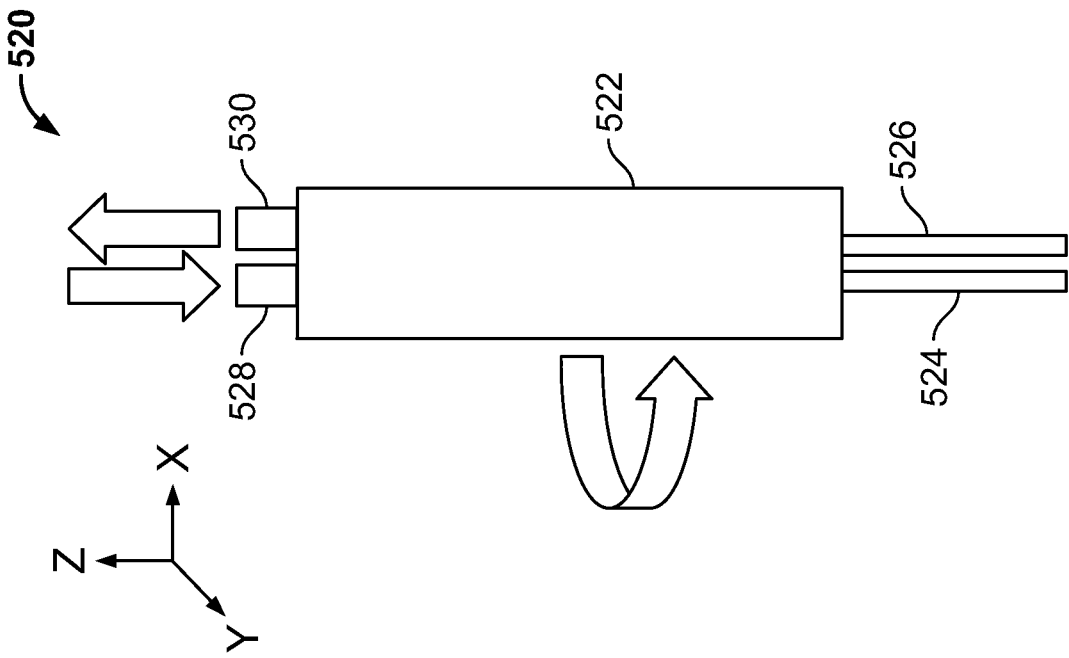
FIG. 5B is a diagram of an embodiment of a combined bulk fluid applicator and fluid aspirator module configured for preparing a circular well in paraffin of a paraffin-embedded tissue section.
Figure 5A:
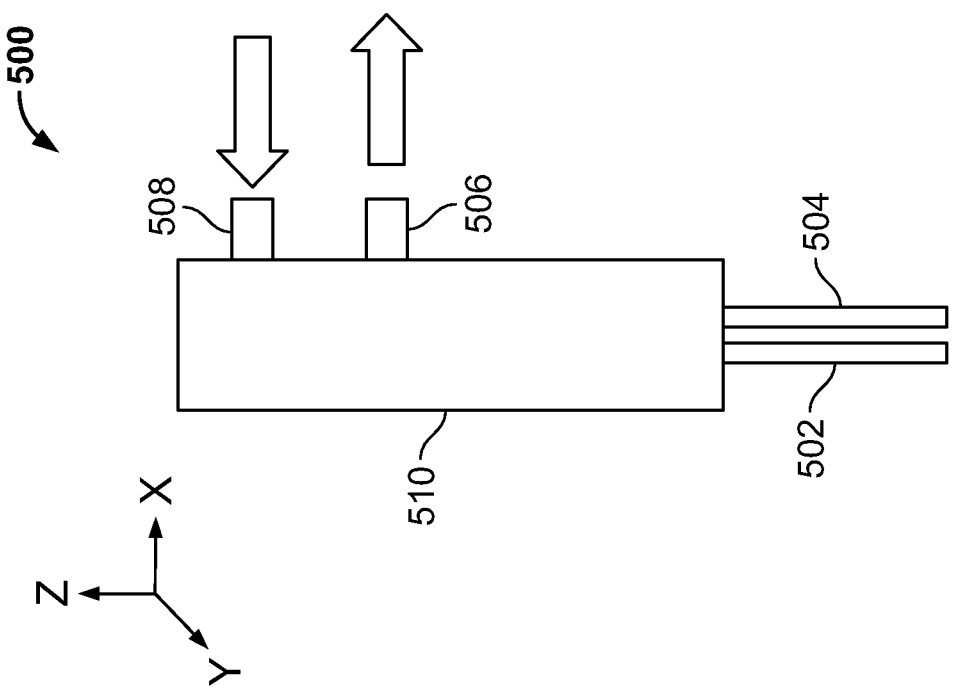
FIG. 5A is a diagram of an embodiment of a combined bulk fluid applicator and fluid aspirator module configured for preparing square or rectangular well in paraffin of a paraffin-embedded tissue section.

FIG. 5A shows another embodiment of a bulk fluid applicator module 500 configured for treatment of a sample disposed on a substrate. In this embodiment, the module includes body 510, a bulk dispense needle 502, a fluid aspiration needle 504, bulk fluid inlet 508 and vacuum port 506 for aspiration of waste fluids away from the sample (such as to waste management system 130 of FIG. 1). The embodiment of FIG. 5A is configured to, for example, treat an entire slide (depending on the separation between the needles) or a portion of a sample, such as for forming a square or rectangular well in paraffin of a paraffin-embedded tissue sample.

FIG. 5B shows yet another embodiment of a bulk fluid applicator module 520, which includes body 522, a bulk dispense needle 524, a fluid aspiration needle 526, bulk fluid inlet 528 and vacuum port 530 for aspiration of waste fluids away from the sample (such as to waste management system 130 of FIG. 1). The embodiment of FIG. 5B is, as indicated, to be rotated in addition to being moved by an actuator in any one or any combination of the x, y and z coordinate directions. The bulk fluid applicator module of this embodiment is also configured to, for example, treat an entire slide (depending on the separation between the needles) or a portion of a sample, such as for forming a square or rectangular well in paraffin of a paraffin-embedded tissue sample as was bulk fluid applicator module 500 of FIG. 5A. However, because the entire module can also be rotated, it is possible, for example, to treat a portion of the sample in a circular pattern. For example, the bulk fluid applicator module 520 can be used for forming a circular well or like shaped well in the paraffin of a paraffin-embedded tissue sample.

Figure 6A:
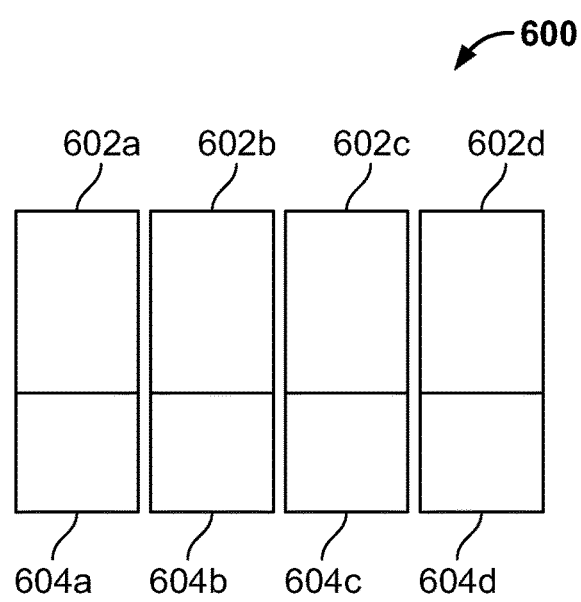
FIG. 6A is a diagram showing an embodiment of droplet-on-demand microfluidic reagent applicators with integrated reagent reservoirs.

FIG. 6A shows one embodiment of microfluidic reagent applicators 600 according to the disclosure. In this embodiment, reagent reservoirs 602a, 602b, 602c, and 602d are integrated with corresponding droplet-on-demand microfluidic actuators 604a, 604b, 604c, and 604d. Microfluidic reagent applicators 600 can be disposable or refillable, and while shown as a group of four individual applicators, one or many more (such as corresponding to each of a number of steps of a staining protocol, which could be 5 or more, 10 or more or even 20 or more) can be combined in a single unit, and used, for example, with the substrate transport/substrate movement system 204 of FIG. 2. Alternatively, groups of individual applicators can be used to simultaneously treat multiple samples, for example, some or all of a group of substrate mounted samples held in a tray holding 5 or more, 10 or more, or even 20 or more such substrate mounted samples. Microfluidic reagent applicators according to this embodiment can be added to and removed from an automated staining system in an entirely manual process or be used in combination with a reagent transport system for loading and unloading through an access port in an enclosure surrounding the staining system.

Figure 6B:
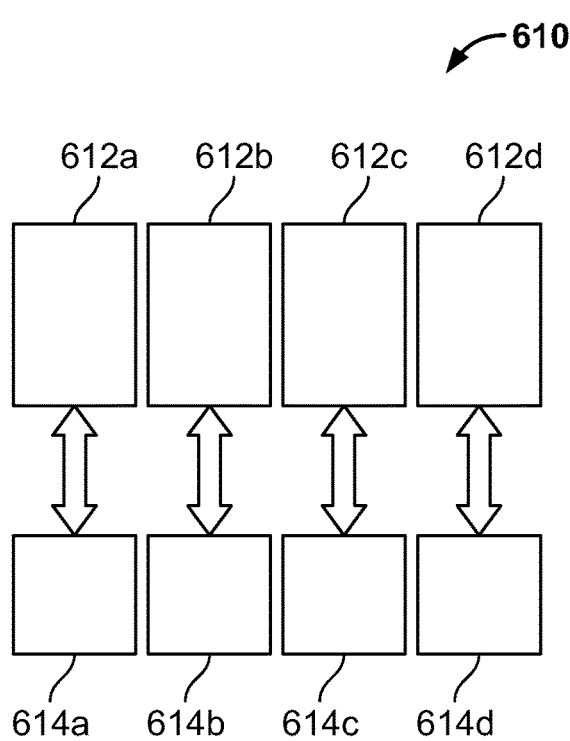
FIG. 6B is a diagram showing an embodiment of droplet-on-demand microfluidic reagent applicators with exchangeable reagent reservoirs.

FIG. 6B shows another embodiment of microfluidic reagent applicators 610 according to the disclosure. In this embodiment, exchangeable reagent reservoirs 612a, 612b, 612c, and 612d are fluidically coupled with corresponding droplet-on-demand microfluidic actuators 614a, 614b, 614c, and 614d. Microfluidic reagent applicator reservoirs 612a, 612b, 612c, and 612d can be disposable or refillable, and, while shown in FIG. 6B as a group of four individual applicators, one or more (such as corresponding to each of a number of steps of a staining protocol, which could be 5 or more, 10 or more or even 20 or more) can be combined in a single unit, and used, for example, with the substrate transport/substrate movement system 204, as illustrated in FIG. 2. Alternatively, groups of individual applicators can be used to simultaneously treat multiple samples, for example, some or all of a group of substrate mounted samples held in a tray holding 5 or more, 10 or more, or even 20 or more such substrate mounted samples. Exchangeable reagent reservoirs 612a, 612b, 612c, and 612d can be added to and removed from an automated staining system in an entirely manual process or be used in combination with a reagent transport system for loading and unloading through an access port in an enclosure surrounding the staining system.

Figure 6C:
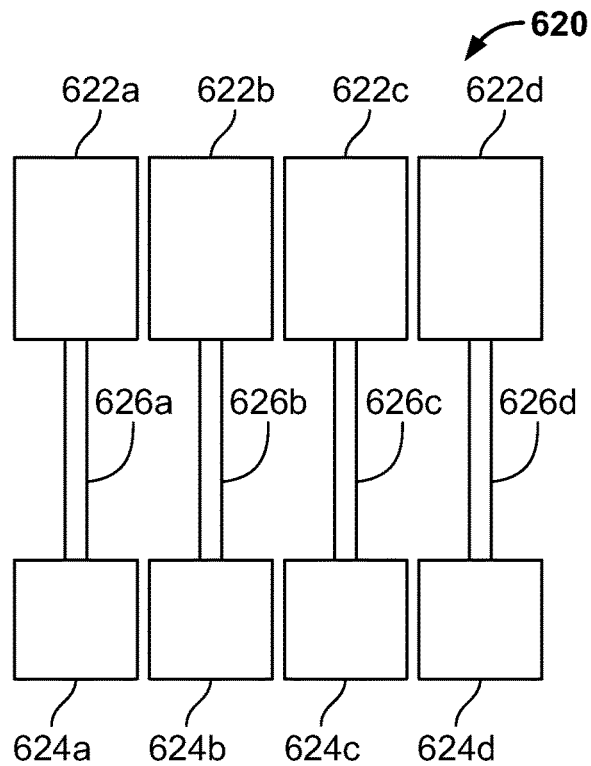
FIG. 6C is a diagram showing an embodiment of droplet-on-demand microfluidic reagent applicators with remote reagent reservoirs.

FIG. 6C shows still another embodiment of microfluidic reagent applicators 620 according to the disclosure. In this embodiment, remote reagent reservoirs 622a, 622b, 622c, and 622d are fluidically coupled with corresponding droplet-on-demand microfluidic actuators 624a, 624b, 624c, and 624d through fluid lines 626a, 626b, 626c, and 626d. Microfluidic reagent applicator reservoirs 622a, 622b, 622c, and 622d can be disposable or refillable, and while shown in FIG. 6C as a group of four individual applicators, one or many more (such as corresponding to each of a number of steps of a staining protocol, which could be 5 or more, 10 or more or even 20 or more) can be combined in a single unit, and used, for example, with the substrate transport/substrate movement system 204 of FIG. 2. Alternatively, groups of individual applicators can be used to simultaneously treat multiple samples, for example, some or all of a group of substrate mounted samples held in a tray holding 5 or more, 10 or more, or even 20 or more such substrate mounted samples. Fluid lines 626a, 626b, 626c, and 626d can be rigid, flexible, or a combination of both rigid and flexible both between lines and within a single line. The embodiment of FIG. 6C is also appropriate for simultaneously treating all or a part of an array of samples such as is shown in FIG. 3 if the lines are flexible. Such an arrangement also provides for the opportunity for refilling of the reservoirs from locations on the outside of an instrument, and as such can also be particularly appropriate for dispensing of bulk fluids.

Figure 6D:
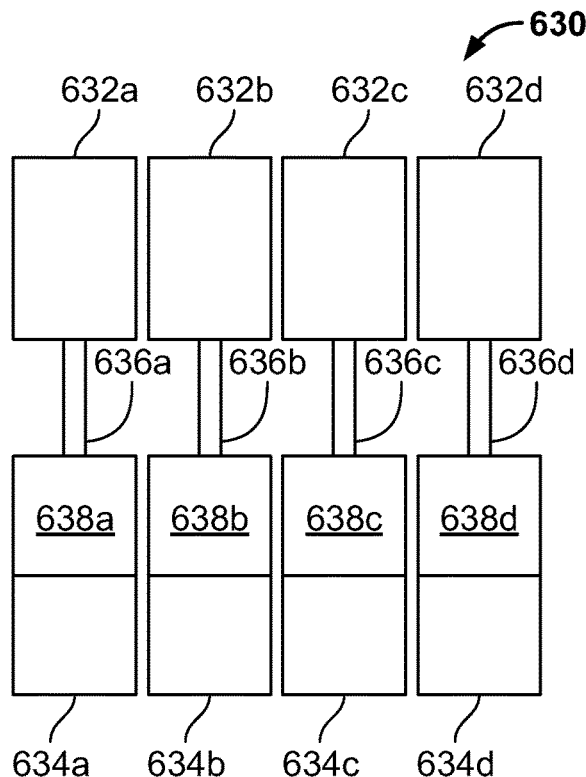
FIG. 6D is a diagram showing an embodiment of droplet-on-demand microfluidic reagent applicators with remote reagent reservoirs and integrated intermediate reservoirs.

FIG. 6D shows a further embodiment of microfluidic reagent applicators 630 according to the disclosure. In this embodiment, remote reagent reservoirs 632a, 632b, 632c, and 632d are fluidically coupled with corresponding droplet-on-demand microfluidic actuators 634a, 634b, 634c, and 634d through fluid lines 636a, 636b, 636c, and 636d. Also included in this embodiment are intermediate reservoirs 638a, 638b, 638c, and 638d. Microfluidic reagent applicator reservoirs 632a, 632b, 632c, and 632d can be disposable or refillable, and while shown in FIG. 6D as a group of four individual applicators, one or more (such as corresponding to each of a number of steps of a staining protocol, which could be 5 or more, 10 or more or even 20 or more) can be combined in a single unit, and used, for example, with the substrate transport/substrate movement system 204 of FIG. 2. Alternatively, groups of individual applicators can be used to simultaneously treat multiple samples, for example, some or all of a group of substrate mounted samples held in a tray holding 5 or more, 10 or more, or even 20 or more such substrate mounted samples. Fluid lines 636a, 636b, 636c, and 636d can be rigid, flexible, or a combination of both rigid and flexible both between lines and within a single line. The embodiment of FIG. 6C is also appropriate for simultaneously treating all or a part of an array of samples such as is shown in FIG. 3 if the lines are flexible. Such an arrangement also provides for the opportunity of refilling of the reservoirs from locations on the outside of an instrument, and as such can also be especially appropriate for dispensing of bulk fluids. Further because of intermediate reservoirs 638a, 638b, 638c, and 638d, remote reagent reservoirs 632a, 632b, 632c, and 632d can be replaced easily on the fly without interrupting processing of samples within the automated staining system.

Any combination of the microfluidic reagent applicators shown and described with respect to FIGS. 6A-6D can also be employed in a single automated biological sample staining system according to the disclosure.

Figure 7:
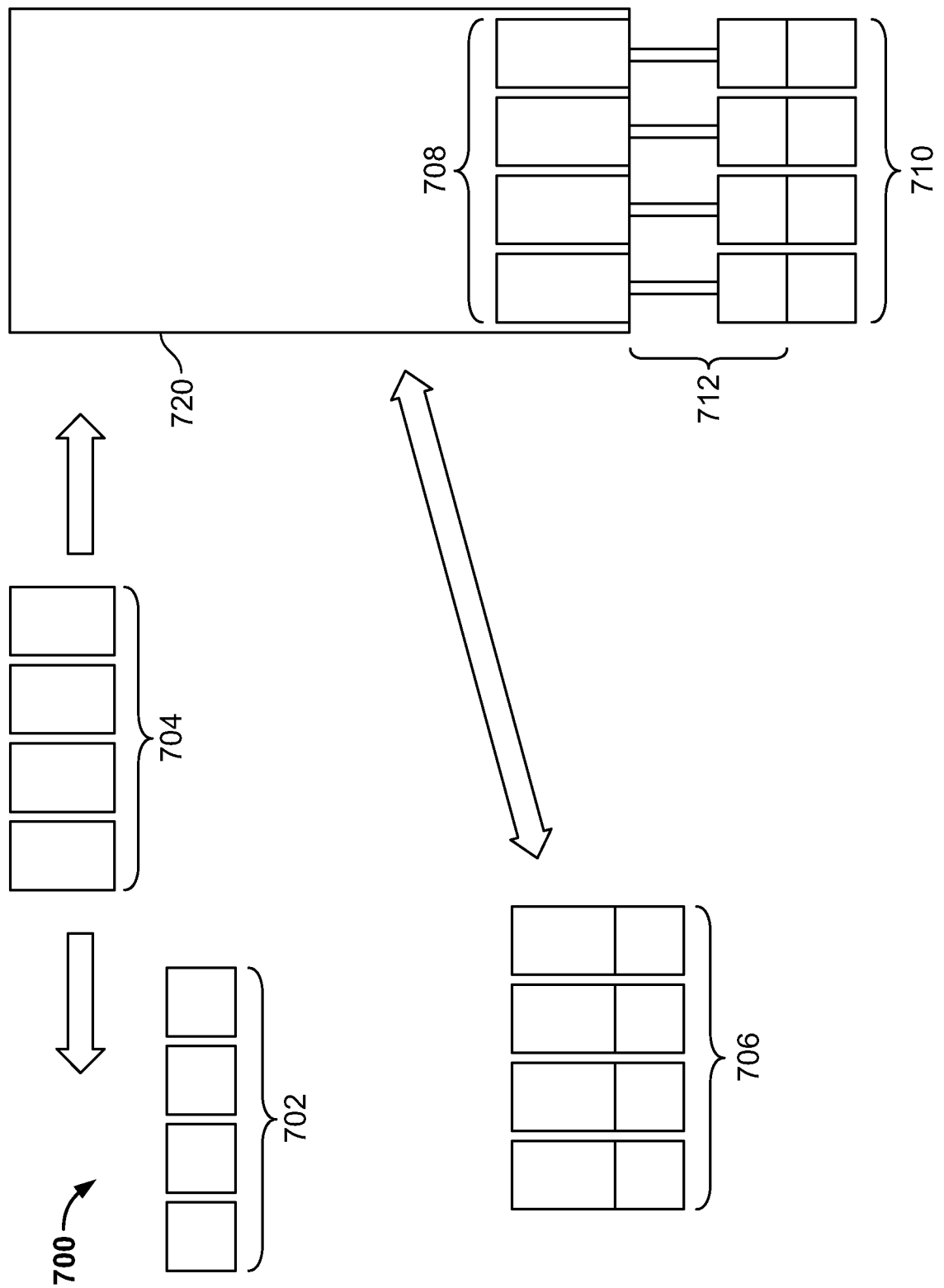
FIG. 7 is a schematic showing how reagent reservoirs can be kept cool when not in use according to a particular embodiment of the disclosed system.

FIG. 7 schematically illustrates a reagent transport system 700 that can be used to move exchangeable fluid reservoirs 704 (such as shown in and described with reference to FIG. 6B), once decoupled from microfluidic actuators 702, to and from a reagent storage unit 720, which can be cooled to extend the life of reagents while not in use. Also illustrated is how the microfluidic reagent applicators (such as shown in and described with reference to FIG. 6A), including integrated reservoirs, 706 can be shuttled by reagent transport system 700 to and from a reagent storage unit 720. FIG. 7 further illustrates how remote reagent reservoirs 708 can be kept in storage and used to feed the microfluidic reagent applicators 710 as needed through lines 712 and optional intermediate reservoirs (such as shown in and described with reference to FIGS. 6C and 6D).

FIG. 8 shows a microfluidic reagent applicator system 800 that includes a single droplet-on-demand actuator head 802 fluidically connected to a plurality of reagent reservoirs 804a, 804b, 804c, and 804d. Also shown in FIG. 8 is an embodiment of a sample substrate holder 806 onto/in which a substrate 808 bearing a sample 810 is placed onto a base 812, which base can be a heater base or a Peltier heating/cooling base. If compatible, the reagents contained in the plurality of reagent reservoirs 804a, 804b, 804c, and 804d can be applied sequentially to perform a staining protocol on sample 810. Such a simple configuration is suitable for a point-of-care system, such as a system for staining frozen tissue samples in surgical suite. Such a point-of-care system could, for example, be used by a surgeon to determine whether he/she has successfully removed a tumor past its margins from a patient. Reagent reservoirs 804a, 804b, 804c, and 804d can be integrated with droplet-on-demand actuator head 802, exchangeable with droplet-on-demand actuator head 802, or located remotely and connected fluidically via lines.

Figure 9A:
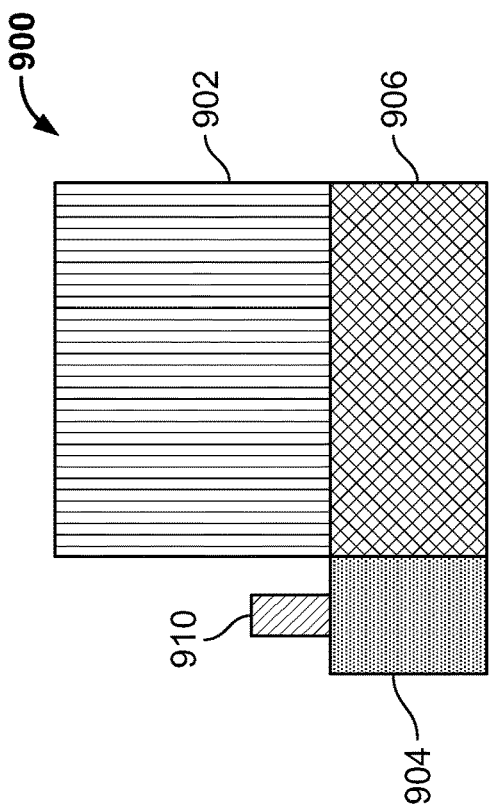
FIG. 9A is a schematic showing a front view of an embodiment of an integrated system including a microfluidic droplet-on-demand actuator, a bulk fluid applicator slit and a fluid aspirator slit.
Figure 9B:
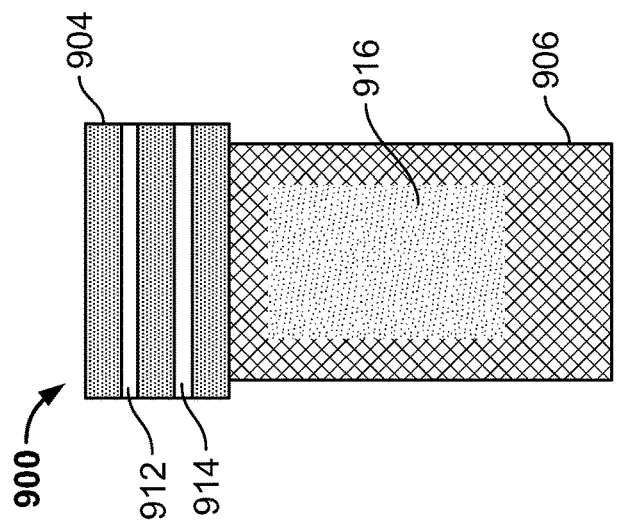
FIG. 9B is a schematic showing a side view of an embodiment of an integrated system including a microfluidic droplet-on-demand actuator, a bulk fluid applicator slit and a fluid aspirator slit.
Figure 9C:
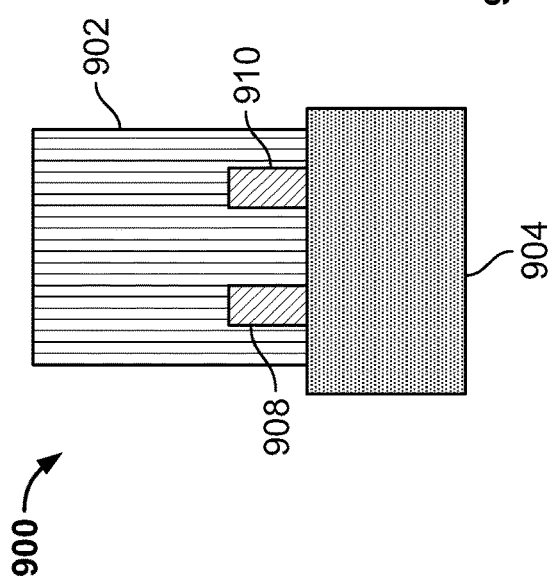
FIG. 9C is a schematic showing a bottom view of an embodiment of an integrated system including a microfluidic droplet-on-demand actuator, a bulk fluid applicator slit and a fluid aspirator slit.

FIG. 9A shows a front view of an embodiment of an integrated system including a microfluidic droplet-on-demand actuator, a bulk fluid applicator slit and a fluid aspirator slit. Reagent reservoir 902 is fluidically coupled to microfluidic reagent applicator head 906 as shown also in FIG. 9B. As shown in the front view of FIG. 9A and the side view of FIG. 9B, a dual slit combination bulk fluid applicator and fluid aspirator 904 is mechanically coupled to microfluidic reagent applicator head 906. As shown in the front view of FIG. 9A, the integrated system includes a bulk fluid inlet 908 and a fluid aspiration port 910, which fluid aspiration port 910 is also shown in the side view of FIG. 9B. FIG. 9C shows the bottom view of the integrated system, and illustrates the dual slit combination bulk fluid applicator and fluid aspirator 904, including bulk fluid applicator slit 912 and fluid aspirator slit 914. Also shown in FIG. 9C is microfluidic droplet-on-demand array 916 of microfluidic reagent applicator head 906.

FIG. 10A shows a front view of an embodiment of an integrated system including a microfluidic droplet-on-demand actuator, a bulk fluid applicator needle and a fluid aspirator needle. Reagent reservoir 1002 is fluidically coupled to microfluidic reagent applicator head 1006 as shown also in FIG. 10B. As shown in the front view of FIG. 10A and in the side view of FIG. 10B, a dual needle combination bulk fluid applicator and fluid aspirator 1004 is mechanically coupled to microfluidic reagent applicator head 1006. As shown in the front view FIG. 10A, the integrated system includes bulk fluid inlet 1008 and fluid aspiration port 1010, which fluid aspiration port 1010 is also show in side view FIG. 10B. As shown in the front view of FIG. 10A, the integrated system includes bulk fluid applicator needle 1012 and fluid aspiration needle 1014, which fluid aspiration needle 1010 is also show in side view FIG. 10B. FIG. 10O shows the bottom view of the integrated system, and illustrates the dual needle combination bulk fluid applicator and fluid aspirator 1004, including bulk fluid applicator needle 1012 and fluid aspirator needle 1014. Also shown in FIG. 10O is a microfluidic droplet-on-demand array 1016 of microfluidic reagent applicator head 906.

Figure 11:
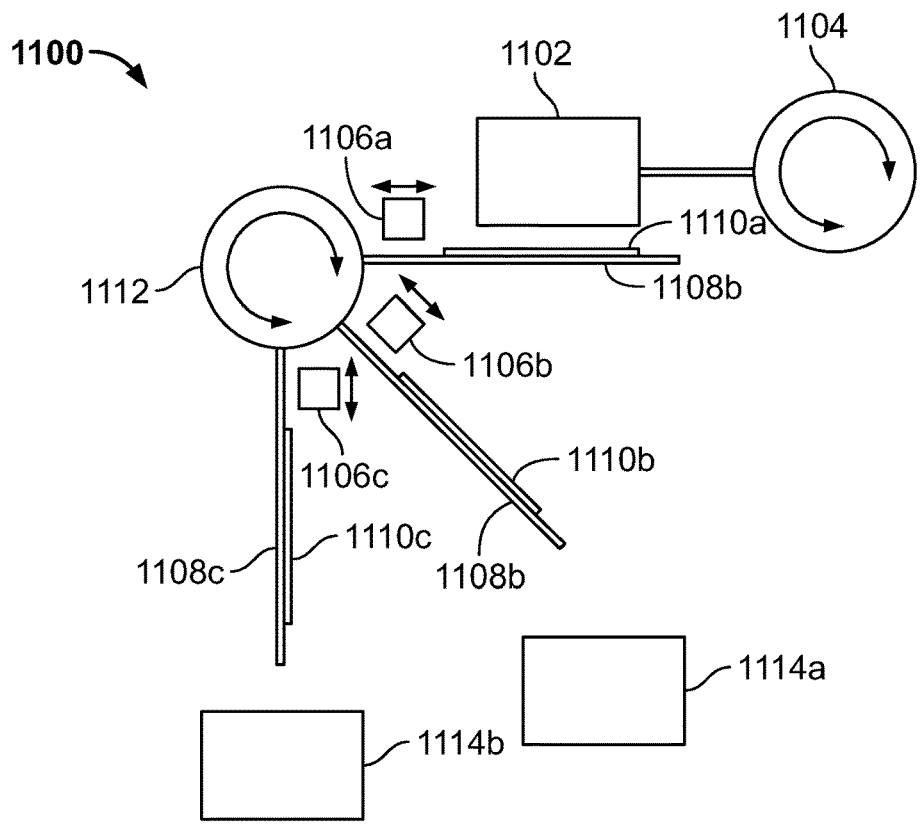
FIG. 11 is a schematic side view of an embodiment of a sub-system of the disclosed system including a microfluidic reagent applicator and a combined bulk fluid applicator and fluid aspirator mechanism configured for waste segregation.

FIG. 11 shows a single staining sub-system 1000 for use alone or in combination with additional such same and other sub-systems according to the disclosure. In this embodiment, a microfluidic reagent applicator 1102 is mechanically coupled to actuator 1104. In some embodiments, also included is substrate holder 1108 which holds a sample bearing substrate 1110. Substrate holder 1108 is also mechanically coupled to an actuator 1112. In some embodiments, also included is a combined bulk fluid applicator and air knife module 1106. One or more waste collection units 1114 (which can be fluidically connected to a waste management system) are also shown. In a loading position, substrate holder 1108a holds sample bearing substrate 1110a in a horizontal position and then the actuator 1104 brings the microfluidic reagent applicator 1102 into position to apply a fluid to the sample. Depending on which reagents are dispensed onto the sample, actuator 1112 moves the substrate holder and substrate to one of at least two different positions 1108b, 1110b or 1108c, or 1110c such that the combined bulk fluid applicator and air knife (such as at positions 1106a, 1106b, or 1106c or at any intermediate positions not illustrated) can apply, for example, a rinse solution and move or "blow" the rinse and any reagent residue removed from the sample into the respective waste collection units 1114a, 1114b. The skilled artisan will appreciate that the bulk fluid applicator and air knife move with the substrate holder in some embodiments, while in other embodiments the bulk fluid applicator and air knife are separate units and not connected to the substrate holder (and thus can move into and out of place). In an alternative embodiment, an entire row of microfluidic reagent applicators can translate back along the rotational axis of actuator 1104 such that additional reagents can be brought to a dispense/loading position in relation to the sample. While illustrated in FIG. 11 with the dispense position being horizontal, alternative configurations are possible wherein the sample bearing substrate is held in positions other than horizontal, such as between about 1 and about 90 degrees from horizontal, or even upside down during application of fluid from a microfluidic reagent applicator.

Figure 12:
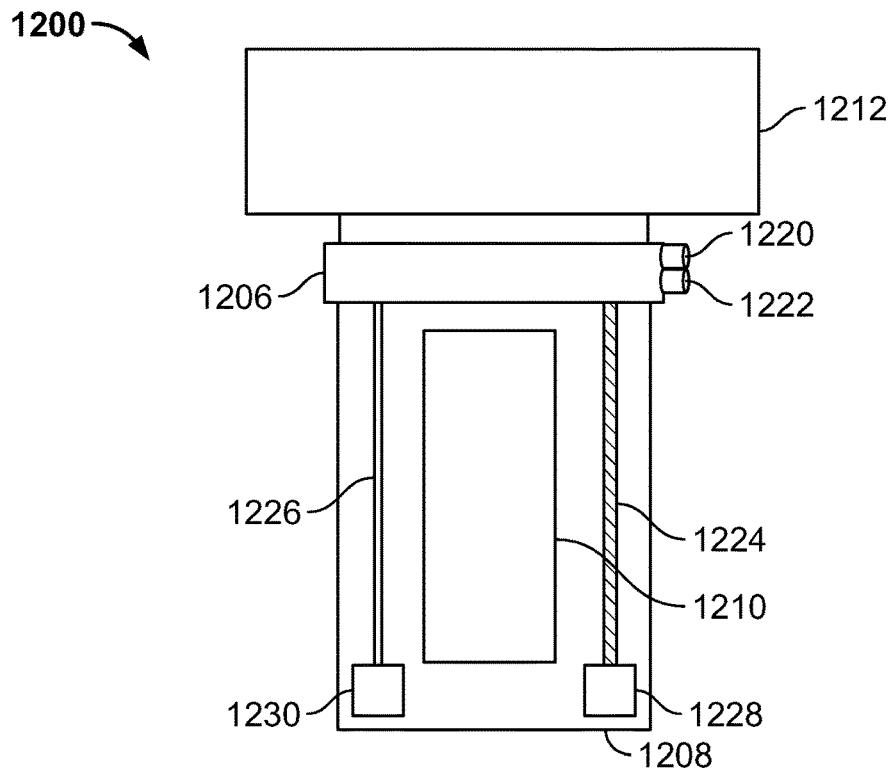
FIG. 12 is a schematic top view of an embodiment of a sub-system of the disclosed system including a microfluidic reagent applicator and a combined bulk fluid applicator and fluid aspirator mechanism.

FIG. 12 shows a top view of the embodiment of FIG. 11, wherein the combined bulk fluid applicator/air knife module is shown as 1206. The substrate holder 1208 holds sample bearing substrate 1210 and module 1206 is moved across the sample bearing substrate 1210 by screw drive 1224 powered by motor 1228. Module 1206 may also be guided by rail 1226 and held in position by stanchion 1230. Air is supplied to module 1206 through port 1220 and bulk fluid is supplied to module 1206 through port 1222.

Figure 13:
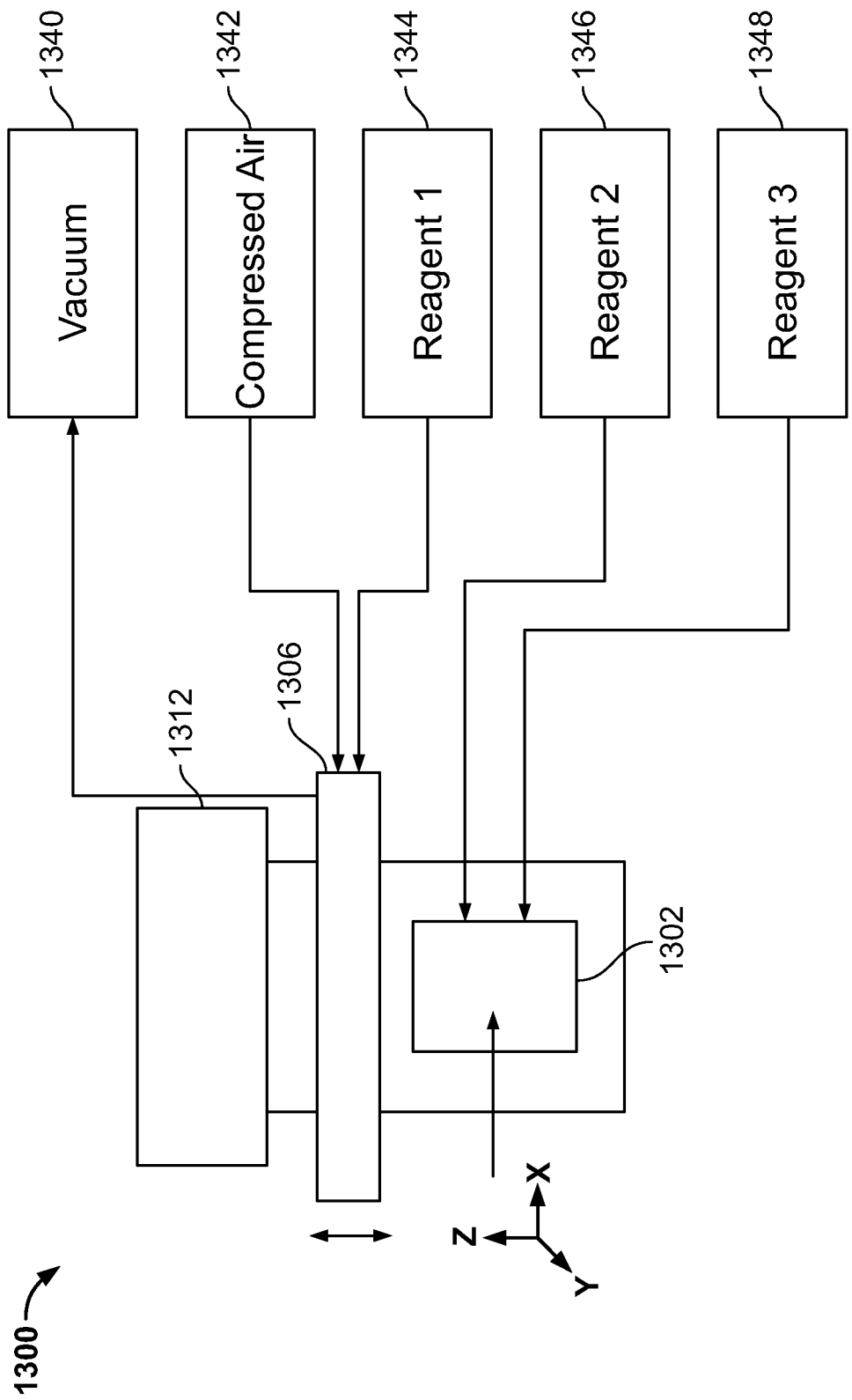
FIG. 13 is schematic top view of an embodiment of a sub-system of the disclosed system including a microfluidic reagent applicator and a combined bulk fluid applicator, fluid aspirator and air knife mechanism.

FIG. 13 shows a top view of the embodiment of FIG. 11, but in this embodiment 1300 with the additional functionality of a bulk fluid applicator/fluid aspirator/air knife module 1306. Microfluidic reagent applicator 1302 is supplied in this embodiment with at least two different reagents 1346 and 1348. Combined bulk fluid applicator/fluid aspirator/air knife module is supplied with vacuum 1340, compressed air 1342 and at least one bulk reagent 1344. Actuator 1312 permits use of the arrangement of FIG. 13 in the embodiment of FIG. 11.

Figure 14:
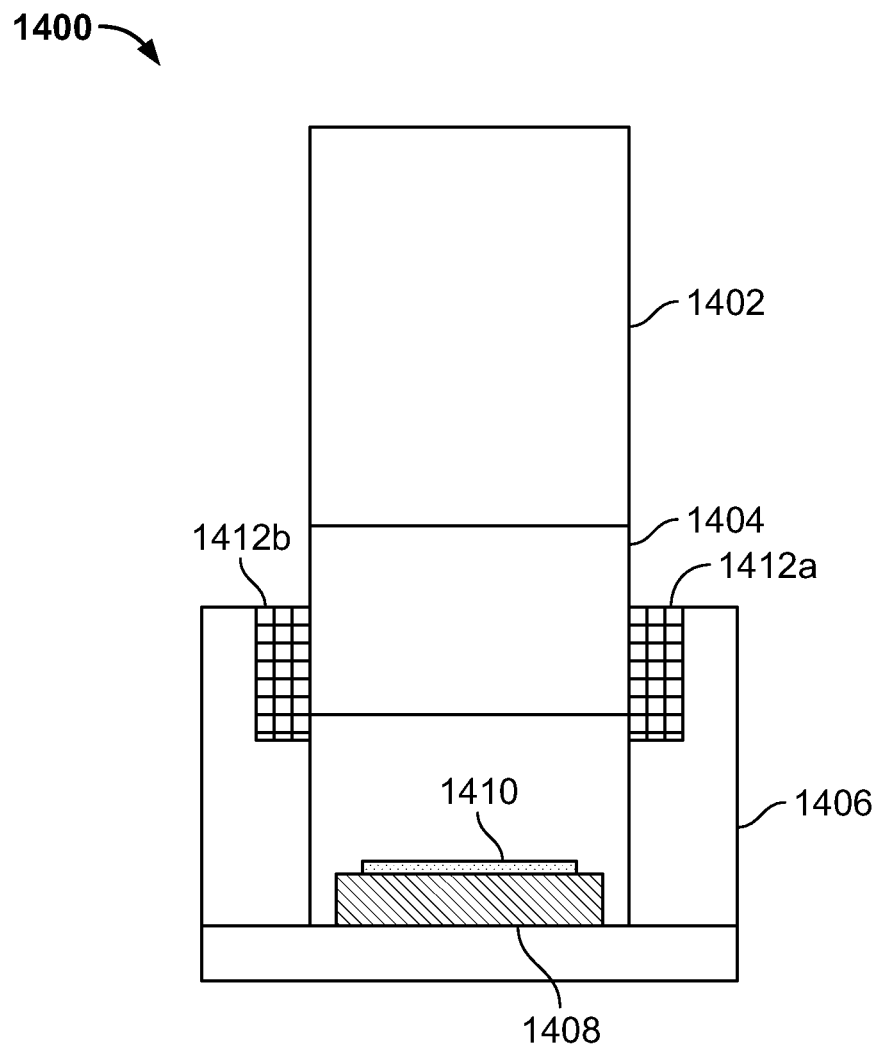
FIG. 14 is schematic front view of an embodiment of a sub-system of the disclosed system including a sample substrate holder configured to mate sealingly with a microfluidic reagent applicator to form a chamber in which a sample can be treated at high temperature and/or high pressures.

FIG. 14 illustrates a particular embodiment of a substrate holder system 1400 that can be used in combination with a microfluidic reagent dispenser to form a chamber over a sample held on a substrate. Here, the microfluidic reagent actuator 1404 mates with substrate holder 1406 and further mates with seals 1412a, 1412b. Inside are show substrate holder 1408 and sample bearing substrate 1410. In some embodiments, the microfluidic reagent actuator is a thermal droplet-on-demand system. In a particular embodiment, fluid reservoir 1402 contains an antigen retrieval solution that is dispensed onto the sample in the chamber. In some embodiments, and provided that a vent is included, the contents dispensed onto the sample may be heated, followed by replenishment with additional fluid. In other embodiments, the chamber is pre-pressurized or a pressure is allowed to build within the chamber as heat is applied.

Applicants have surprisingly discovered that hematoxylin and eosin, which are generally not compatible in solution, can be co-dispensed using the systems and methods of the present disclosure. In comparison to a linear assay, co-dispensing utilizing the systems and methods disclosed herein allows for a significant reduction in the number of assay steps (e.g. 10 steps to 5 steps) and a concomitant reduction in total volume of the assay (e.g. about 2.44 mL/slide to about 1.26 mL/slide), while yielding similar results.

Figure 15B:
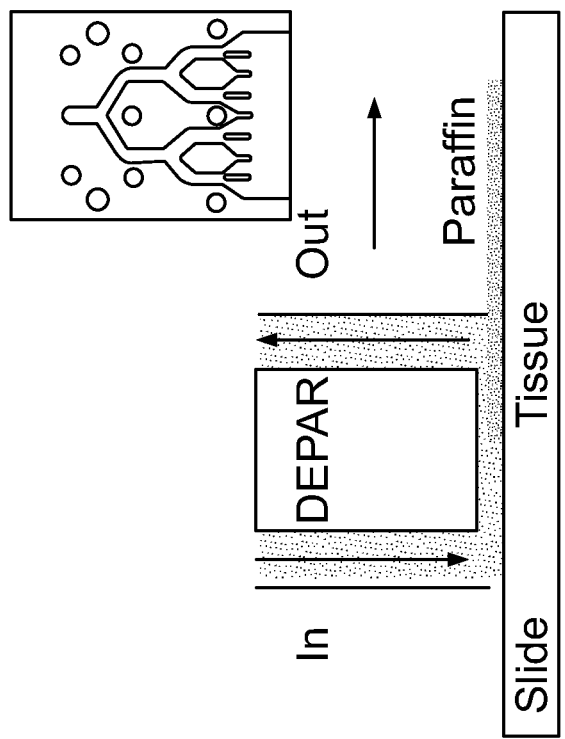
FIGS. 15A and 15B illustrate two methods for deparaffinization.
Figure 15A:
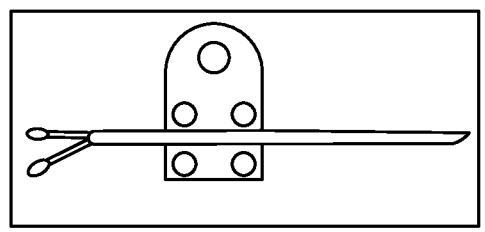
Figure 15A:

FIGS. 15A and 15B show two embodiments of deparaffinization according to the disclosure, both of which compared favorably with standard methods in terms of incubation time, and volume. The figure illustrates printed deparaffinization, namely the printing of organic and transfer fluids onto a paraffin section follows by bulk washing with solution. It was discovered that co-printing or sequential modes was possible. The assay required a low volume (about 100 uL/in^2) and little or no incubation time (about 2 minutes to print). A single pass of microfluidic deparaffinization using a double needle and double slit (as described herein) may be utilized, again requiring a low volume (about 100 uL/in^2) and little or no incubation time (about 2 minutes to print).

While particular arrangements of bulk fluid applicators, fluid aspirators and air knives have been disclosed above, other arrangements are possible. For example, system described, for example, in U.S. Pat. No. 8,883,509 could be used in combination with other features disclosed herein. Likewise, certain bulk fluid handling and reagent dispensing mechanisms disclosed in WO2015/086534 could be used in combination with other features disclosed herein.

Additional Embodiments

Mention will be made to the various components illustrated in FIG. 16. In some embodiments, the control system or control scheme includes a "Print Instruction and Map Generator" which functions to create a combination two (or three) axis motion in tandem with the actuation of nozzles to plan for the directed delivery of droplets to provide the desired image on the droplet target. Generally, this is a mapping between a binary (or monochrome) bitmap file where one state of each pixel in the file (i.e. a logical True) corresponds to a single droplet dispensed from a single nozzle, in a particular location. Conversely a logical False state would correspond to not firing in that position during the print routine. Outputs of this function are instructions for the motion system as well as instructions for the print system.

In some embodiments, the control system or control scheme includes a "Digital Firing Pulse Generator" whose function is to decompose the Print Map in the context of both the Relative Motion System as well as the assignment of the individual droplet dispense operations to the corresponding nozzle.

In some embodiments, the control system or control scheme includes a "Relative Motion System" which facilitates a motion of the target with respect to the print head via a set of commands sent (i.e. Print Instructions) from the Print Instruction and Map Generator. Information about the motion of the system with respect to reference positions is relayed via a Step Counter to the Digital Firing Pulse Generator in order to monitor the progress in mapping the image to a physical print and correspondingly when during that print to actuate a droplet to deposit onto the Droplet Target.

In some embodiments, the control system or control scheme includes a "Step Counter." The Step Counter provides function by which the motion and relative position of the target and print head are understood by the Digital Firing Pulse Generator in order to entrain the deposition of droplets with the Relative Motion System.

In some embodiments, the control system or control scheme includes a "Waveform Generator." When a logical True is issued onto a particular nozzle address, the act of droplet dispensing is initiated. This function converts that signal into the analog signal required to prepare, dispense, and re-prime the nozzle for successful ejection of a droplet.

In some embodiments, the control system or control scheme includes an "Amplifier." The generated waveform is amplified into an appropriate range of excitation potential (i.e. Voltage or Energy) to induce the ejection of a droplet.

In some embodiments, the control system or control scheme includes a "Fluid Droplet Dispenser—The amplified signal is passed to the corresponding nozzle and a droplet is fired from the nozzle, in step with the Relative Motion System onto the Droplet Target.

In some embodiments, the control system or control scheme includes a "Droplet Target." The ultimate target to receive droplet from the Fluid Droplet Dispenser, moved in concert via the Relative Motion System, to map the Print Map onto this target.

Mention will be made to the various of the physical control scheme outlined in FIG. 17. In some embodiments, the control system or control scheme includes a CPU—The CPU in this case is a desktop computer. The role of the CPU is to coordinate the issuing of commands to the physical systems via Print Instructions and a Print Map. These are derived from a monochrome bitmap file, and the desired droplet print densities for the x and y axis directions. The x-axis print density is physically determined by setting the encoder step size for the Print Manager Board and the y axis print density is set by adjusting the saber angle of the print head. For example, 1000×1000-pixel image to be printed at 1000×1000 dpi would produce a print of 1 in2. Likewise, that same image printed at 500×500 dpi would produce a print of 2 in2. Finally, that same image printed at 2000×2000 dpi would produce a print of 0.5 in2. As part of the print instructions, the CPU provides speed information to the Relative Motion System as well as a y-step, and a starting position for the print job. The printing is system is locked into a "raster print" configuration, whereby the image is converted into a print on the Printing Target through successive printing moves in the x-direction followed by an incremental y-step movement prior to the next printing pass in the x direction.

In some embodiments, the control system or control scheme includes a Print Instructions—Information about the print job to coordinate the Relative Motion System and Print Manager Board.

In some embodiments, the control system or control scheme includes a Print Map—Monochromatic (i.e. binary) bitmap file where a logical True corresponds to a droplet dispense and a logical False corresponds to the lack of a droplet dispense. The Print Map is scaled using the x and y print densities when it is converted from a pixel map to an actual print (as described above in the CPU section).

In some embodiments, the control system or control scheme includes a Print Manager Board—performs the role of the Digital Firing Pulse Generator function in the previous section. The board decomposes the Print Map to assign nozzles to fire for particular pixels in the map. Given information about the encoder step size, determines how many encoder pulses to wait between each pixel in the Print Map. Generally, there is a one-to-many relationship between this board and the Drive Card, with the Drive Cards effectively acting as daughterboard to the high-level function performed on the Print Manager Board.

In some embodiments, the control system or control scheme includes a Relative Motion System—As described above in the previous section.

In some embodiments, the control system or control scheme includes Digital Firing Signals—The Print Manager Board, upon identifying that a droplet dispense operation must occur (via the deconstructed Print Map and monitoring the print head position with the Encoder Step Pulses as feedback), issues a command for a nozzle (or multiple nozzles in coordination), by issuing a firing signal down the corresponding data path to the nozzle's Drive Card.

In some embodiments, the control system or control scheme includes a Drive Card—Performs the Waveform Generator and Amplifier functions described in the previous section. Responsible for power management, eliminating cross-talk between firing nozzle electrical paths, returning the print nozzle to a ready state to fire again. Generally, maps one-to-one with a print head, where the Drive Card provides a dedicated signal line for each nozzle on the print head. However, the actual architecture may support a one-to-many association to the print heads since each signal line is mapped to a nozzle and is agnostic of whether those nozzles are co-located on the same print head.

In some embodiments, the control system or control scheme includes Vector Graphics—in another embodiment a plotter approach and Vector Graphics (e.g. PostScript) language to describe the print operation may offer some benefits. Vector graphics describes lines and arcs for printing instead of pixels. This allows for infinite scaling and transformation of print images without a loss of resolution. It also allows for complex coordinated movement of the print system. Print operations may be programmatically defined (functions, loops, variables, etc.), instead of statically defined via image files. In this environment, for example, a print vector may be defined of a certain length, speed, firing frequency, and width of the print swath.

Advantages (as denoted in FIG. 17) refers to a common framework for describing all motion components for any operations the stainer needs to perform (washing, drying, etc.). Allows complex 2- or 3-axis printing operations. No need to perform sequential x-direction print operations followed by y steps. Easy to dilate and transform image of tissue into a print area or reuse an image from one slide to print another stain onto another slide with a cut of the same tissue.

Multi-color bitmap—Instead of individual monochromatic bitmaps for every print head and every print image to be applied to the sample, encode this information in a more complex image data file. For example, the print operation may be encoded as a 64-bit bitmap, which allows for eight temporal print patterns to be mapped to eight unique print heads. May be a very efficient way to encode an entire complex assay in a very concise format. It could accommodate a large number of printed reagents, co-printing operations, ratiometric printing operations, gradient printing operations.

Advantages (as denoted in FIG. 17) refers to a concise scheme for defining the use of multiple print heads simultaneously or for describing the temporal re-application of reagents via printing. May be compressed using common image storage languages such as JPEG, TIFF, JPEG-2000, etc. as opposed to bitmap file format.

Various other modifications of the disclosed system and method, in addition to those described herein, will be apparent to those skilled in the art from the foregoing description. Such modifications are also intended to fall within the scope of the appended claims. For example, while the foregoing disclosure has focused on treatment of cell and tissue samples mounted on microscope slides, the disclosed system and method could equally be applied in its various embodiments to preparation of other types of biological samples on other types of substrate, for example, for preparation of micro-arrays of nucleic acids or antibodies or of target biological samples for mass spectrometric analysis, or for preparation of hematological samples. Each reference cited in the present application is incorporated by reference herein to the extent that it is not inconsistent with the present disclosure.

We claim:

1. An automated biological sample staining system, comprising
a. at least one microfluidic reagent applicator, wherein the at least one microfluidic reagent applicator is fluidically coupled to at least one reagent reservoir, wherein the at least one reagent reservoir is integrated within the at least one microfluid reagent applicator;
b. at least one bulk fluid applicator in fluidic communication with one or more refillable remote bulk reagent reservoirs;
c. at least one fluid aspirator;
d. at least one sample substrate holder;
e. at least one relative motion system; and
f. a control system that is programmed to execute at least one staining protocol on a sample mounted on a substrate that is held in the at least one sample substrate holder, wherein the control system controls the at least one microfluidic reagent applicator, the at least one bulk fluid applicator, the at least one fluid aspirator, the at least one sample substrate holder and the at least one relative motion system to execute individual steps of the at least one staining protocol.

2. The system of claim 1, further including at least one sample imaging system.

3. The system of claim 1, further including at least one air knife.

4. The system of claim 1, further including at least one waste management system.

5. The system of claim 1, further including at least one sample identification system communicatively coupled to the control system.

6. The system of claim 1, wherein the at least one bulk fluid applicator and the at least one fluid aspirator are combined in at least one of a first type of a reagent management unit.

7. The system of claim 6, wherein the at least one bulk fluid applicator and the at least one fluid aspirator comprise a pair of needles.

8. The system of claim 7, wherein the pair of needles are separated by at least 0.1 mm.

9. The system of claim 1, wherein the at least one microfluidic reagent applicator, the at least one bulk fluid applicator and the at least one fluid aspirator are combined in at least one of a second type of reagent management unit.

10. The system of claim 2, wherein the at least one microfluidic reagent applicator, the at least one bulk fluid applicator and the at least one air knife are combined in at least one of a third type of reagent management unit.

11. The system of claim 2, wherein the at least one microfluidic reagent applicator, the at least one bulk fluid applicator, the at least one fluid aspirator, and the at least one air knife are combined in at least one of a fourth type of reagent management unit.

12. The system of claim 11, wherein the at least one of any of the first, second, third and fourth type of reagent management units are coupled to the at least one relative motion system.

13. The system of claim 1, wherein the at least one sample substrate holder is coupled to the at least one relative motion system.

14. The system of claim 11, wherein at least one of any of the first, second, third and fourth type of reagent management unit, and the at least one sample substrate holder, are both coupled to the at least one relative motion system.

15. The system of claim 1, wherein the system includes two or more microfluidic reagent applicators.

16. The system of claim 1, further comprising a cooled reagent storage unit.

17. The system of claim 1, further comprising a reagent transport system.

18. The system of claim 1, wherein the system includes two or more bulk fluid applicators and two or more fluid aspirators.

19. The system of claim 1, wherein the at least one microfluidic reagent applicator comprises a micro-fabricated chip applicator.

20. An automated biological sample staining system, comprising
a. at least one microfluidic reagent applicator, wherein the at least one microfluidic reagent applicator is fluidically coupled to at least one removable reagent reservoir;
b. at least one bulk fluid applicator in fluidic communication with one or more refillable remote bulk reagent reservoirs;
c. at least one fluid aspirator;
d. at least one sample substrate holder;
e. at least one relative motion system; and
f a control system that is programmed to execute at least one staining protocol on a sample mounted on a substrate that is held in the at least one sample substrate holder, wherein the control system controls the at least one microfluidic reagent applicator, the at least one bulk fluid applicator, the at least one fluid aspirator, the at least one sample substrate holder and the at least one relative motion system to execute individual steps of the at least one staining protocol.

21. The system of claim 20, further including at least one sample imaging system.

22. The system of claim 20, further including at least one air knife.

23. The system of claim 20, further including at least one waste management system.

24. The system of claim 20, wherein the at least one bulk fluid applicator and the at least one fluid aspirator are combined in at least one of a first type of a reagent management unit.

25. The system of claim 24, wherein the at least one bulk fluid applicator and the at least one fluid aspirator comprise a pair of needles.

26. The system of claim 20, further comprising a cooled reagent storage unit.

27. The system of claim 20, further comprising a reagent transport system.

28. An automated biological sample staining system, comprising
a. a piezoelectric reagent applicator fluidically coupled to at least one reagent reservoir;
b. at least one bulk fluid applicator in fluidic communication with one or more refillable remote bulk reagent reservoirs;
c. at least one fluid aspirator;
d. at least one sample substrate holder;
e. at least one relative motion system;
f. at least one sample imaging system; and
g. a control system that is programmed to execute at least one staining protocol on a sample mounted on a substrate that is held in the at least one sample substrate holder, wherein the control system controls the at least one microfluidic reagent applicator, the at least one bulk fluid applicator, the at least one fluid aspirator, the at least one sample substrate holder, the at least one sample imaging system; and the at least one relative motion system to execute individual steps of the at least one staining protocol.

29. The system of claim 28, further including at least one sample imaging system.

30. The system of claim 28, further including at least one air knife.

31. The system of claim 28, further including at least one waste management system.

32. The system of claim 28, wherein the at least one bulk fluid applicator and the at least one fluid aspirator are combined in at least one of a first type of a reagent management unit.

33. The system of claim 32, wherein the at least one bulk fluid applicator and the at least one fluid aspirator comprise a pair of needles.

34. The system of claim 28, further comprising a cooled reagent storage unit.

35. The system of claim 28, further comprising a reagent transport system.

* * * * *